(12) United States Patent
Bethel et al.

(10) Patent No.: US 6,614,826 B1
(45) Date of Patent: *Sep. 2, 2003

(54) LASER SYSTEM AND METHOD FOR GAIN MEDIUM WITH OUTPUT BEAM TRANSVERSE PROFILE TAILORING LONGITUDINAL STRIPS

(75) Inventors: Jason W. Bethel, Seattle, WA (US); Eugene F. Yelden, Mill Creek, WA (US); Jeffery A. Broderick, Seattle, WA (US)

(73) Assignee: Synrad, Inc., Mukilteo, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,733

(22) Filed: May 5, 2000

(51) Int. Cl.[7] .................................................. H01S 3/06
(52) U.S. Cl. .............................. 372/64; 372/66; 372/87; 372/39
(58) Field of Search ............................ 372/66, 93, 39, 372/87, 64, 19, 92

(56) References Cited

U.S. PATENT DOCUMENTS

| | | | |
|---|---|---|---|
| 4,719,639 A | | 1/1988 | Tulip ........................... 372/66 |
| 4,720,691 A | * | 1/1988 | Rammos ..................... 333/122 |
| 4,894,831 A | * | 1/1990 | Alfrey ......................... 372/19 |
| 4,939,738 A | | 7/1990 | Opower ....................... 372/95 |
| 5,048,048 A | | 9/1991 | Nishimae et al. ............. 372/95 |
| 5,123,028 A | | 6/1992 | Hobart et al. ................. 372/95 |
| 5,140,606 A | | 8/1992 | Yarborough et al. .......... 372/64 |
| 5,197,079 A | | 3/1993 | Krueger et al. ............... 372/87 |
| 5,220,577 A | | 6/1993 | Opower ....................... 372/92 |
| 5,231,644 A | | 7/1993 | Krueger et al. ............. 372/107 |
| 5,245,625 A | | 9/1993 | Guenther ..................... 372/82 |
| 5,335,242 A | | 8/1994 | Hobart et al. ................. 372/95 |
| 5,353,297 A | | 10/1994 | Koop et al. ................... 372/64 |
| 5,600,668 A | | 2/1997 | Erichsen et al. .............. 372/87 |
| 5,661,746 A | | 8/1997 | Sukhman et al. ............. 372/83 |
| 5,748,663 A | | 5/1998 | Chenausky ................... 372/64 |
| 5,754,575 A | | 5/1998 | Sukhman et al. ............. 372/36 |
| 5,822,354 A | | 10/1998 | Vitruk ......................... 372/92 |
| 5,894,493 A | | 4/1999 | Sukhman et al. ............. 372/83 |
| 6,198,759 B1 | * | 3/2001 | Broderick et al. ............ 372/39 |
| 6,298,080 B1 | * | 10/2001 | Heist et al. ................... 372/99 |

OTHER PUBLICATIONS

Hall, D.R. and C.A. Hill, "Radiofrequency–Discharge–Excited $CO_2$ Lasers," in Peter K. Cheo (ed.), *Handbook of Molecular Lasers*, Marcel Dekker, Inc., 1987, pp. 165–258.
Hodgson, N. and H. Weber, *Optical Resonators: Fundamentals, Advanced Concepts and Applications*, Springer–Verlag, London 1997, Chap. 2, "Wave Optics," pp. 53–62.

* cited by examiner

*Primary Examiner*—Paul Ip
*Assistant Examiner*—James Menefee
(74) *Attorney, Agent, or Firm*—Davis Wright Tremaine LLP; George C. Rondeau, Jr.; Brian L. Johnson

(57) ABSTRACT

A laser system and method having an output laser beam uses an gain medium with one or more output beam transverse profile tailoring (OBTPT) longitudinal strips to tailor the transverse profile of the output laser beam to a desirable shape such as having a symmetrical profile transverse to the direction of propagation of the output laser beam. The laser system has two reflector systems on opposite ends in the long z-axis dimension of the gain medium to form a resonator that outputs the output laser beam following the same long z-axis dimension. In some embodiments the gain medium has a narrow y-axis dimension and a wide x-axis dimension. In these embodiments the OBTPT longitudinal strips have lengths running the long z-axis dimension, widths running the wide x-axis dimension and thicknesses running the narrow y-axis dimension of the gain medium. The widths of the OBTPT longitudinal strips are generally chosen with respect to coupling width of the output laser beam. The OBTPT longitudinal strips are contoured to change their y-axis thicknesses with respect to position along the z-axis so that the output laser beam is formed with a desired transverse profile upon exiting the laser system. Location, number, contouring, and other aspects of the OBTPT longitudinal strips can be varied depending upon the particular output beam tailoring that is desired.

42 Claims, 27 Drawing Sheets

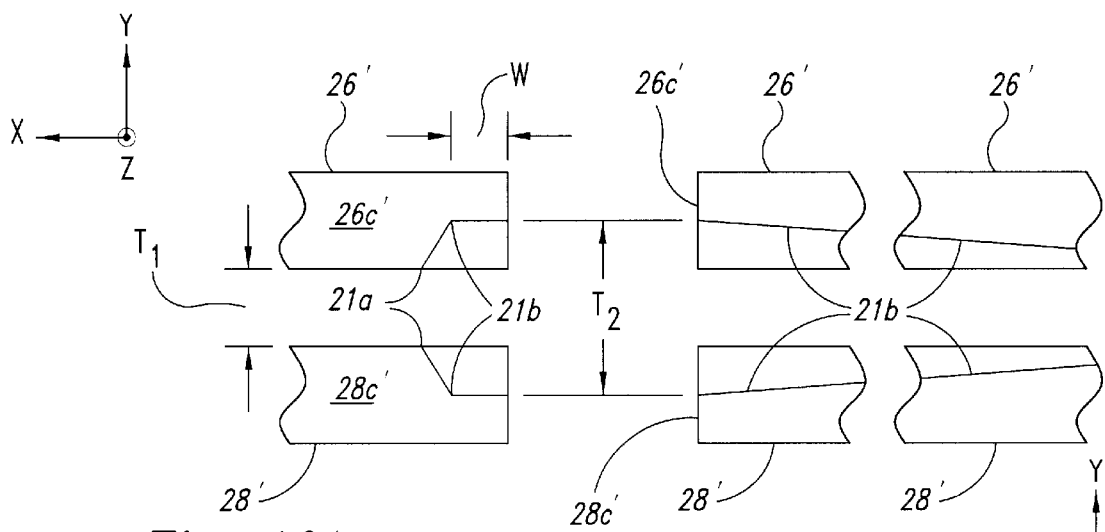
Fig. 19A
Fig. 19B
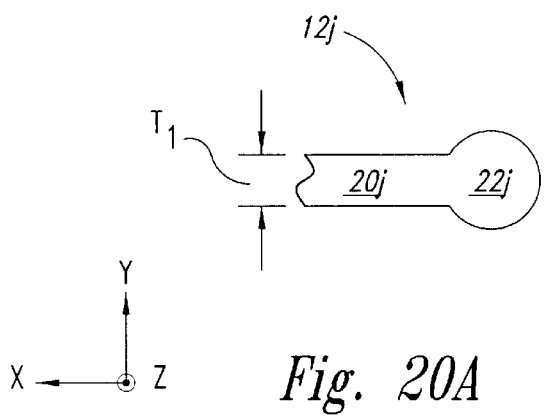
Fig. 20A
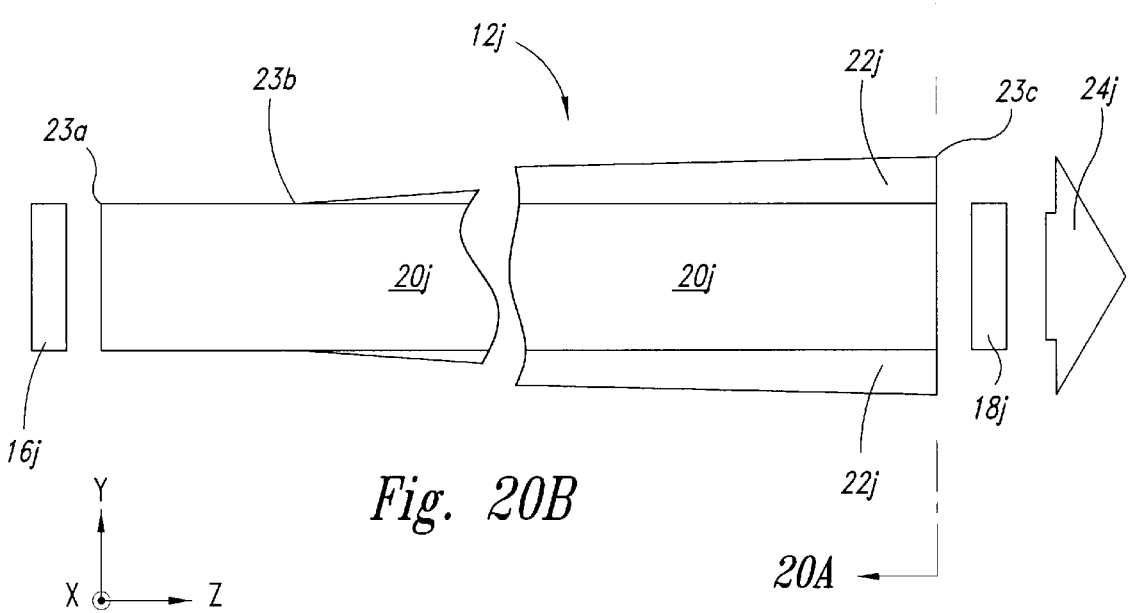
Fig. 20B

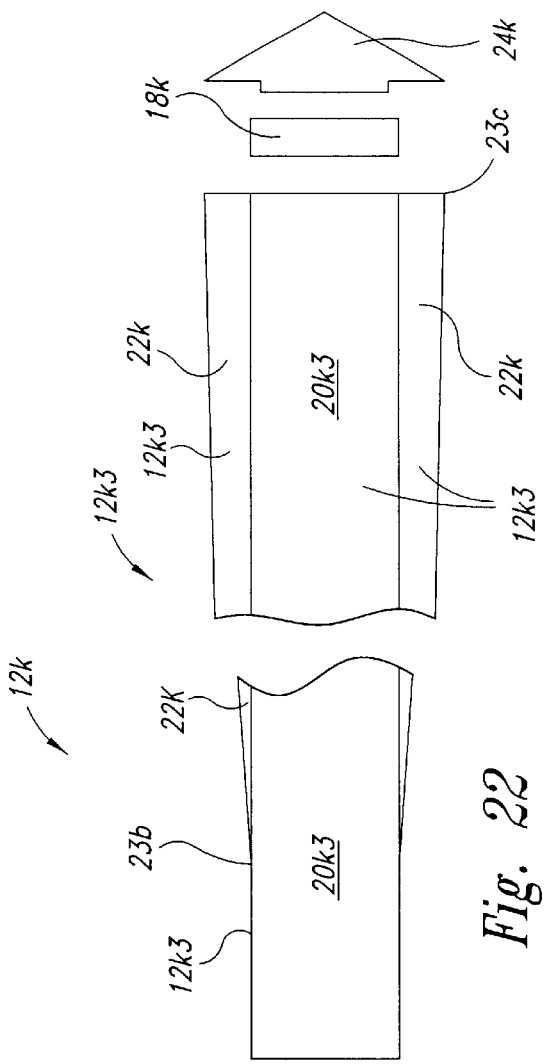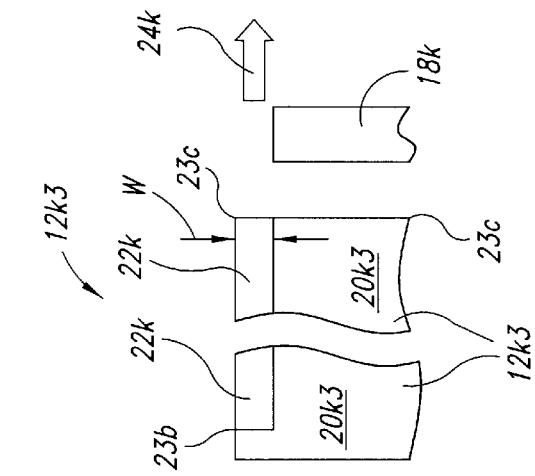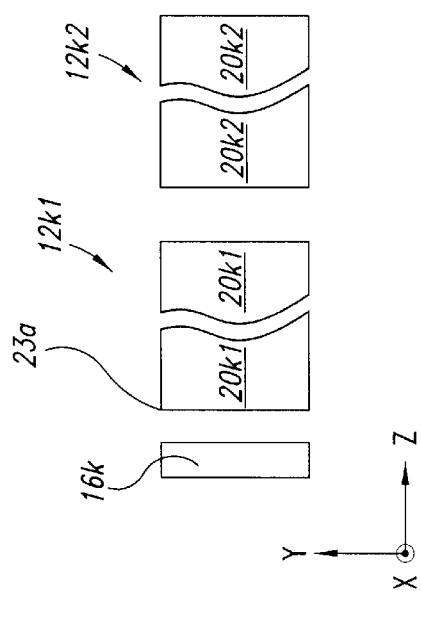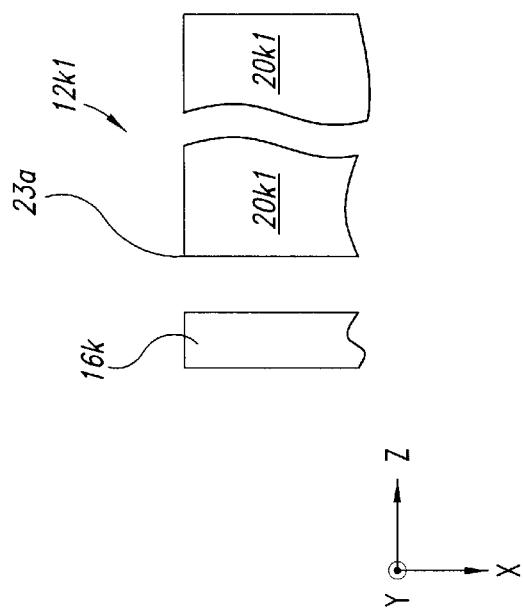
Fig. 22
Fig. 23

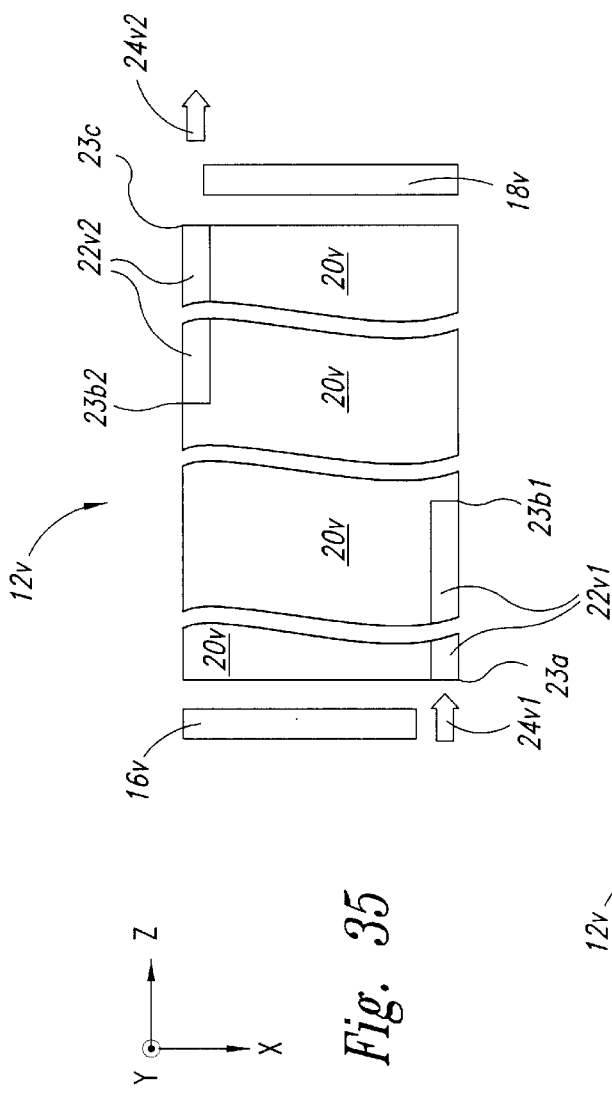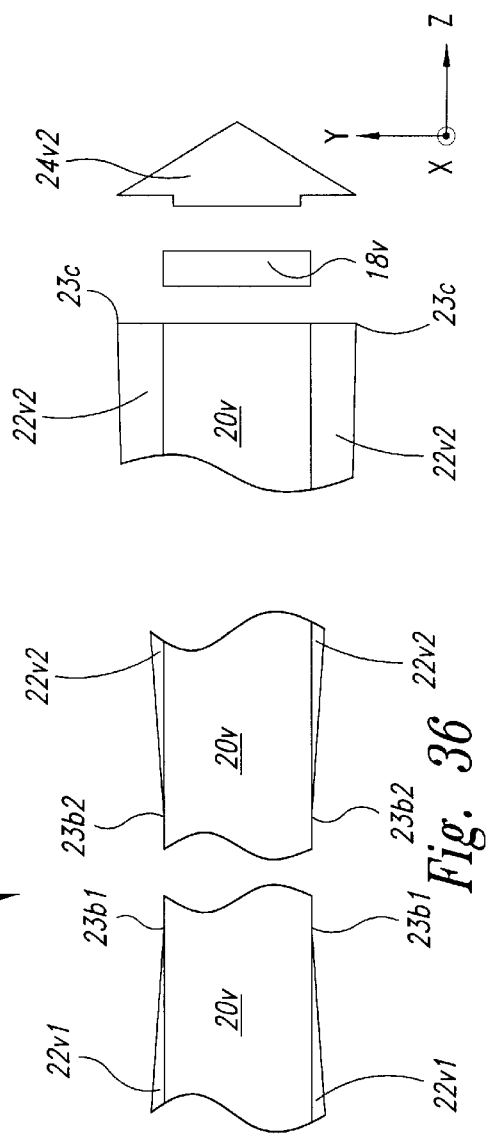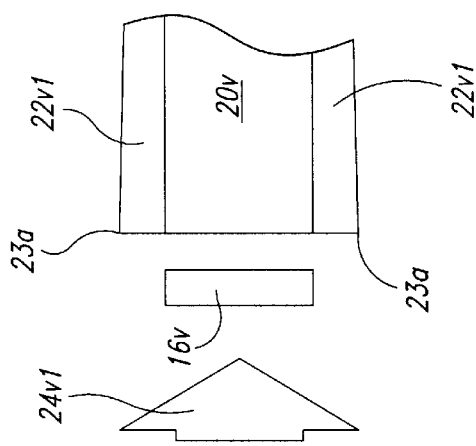

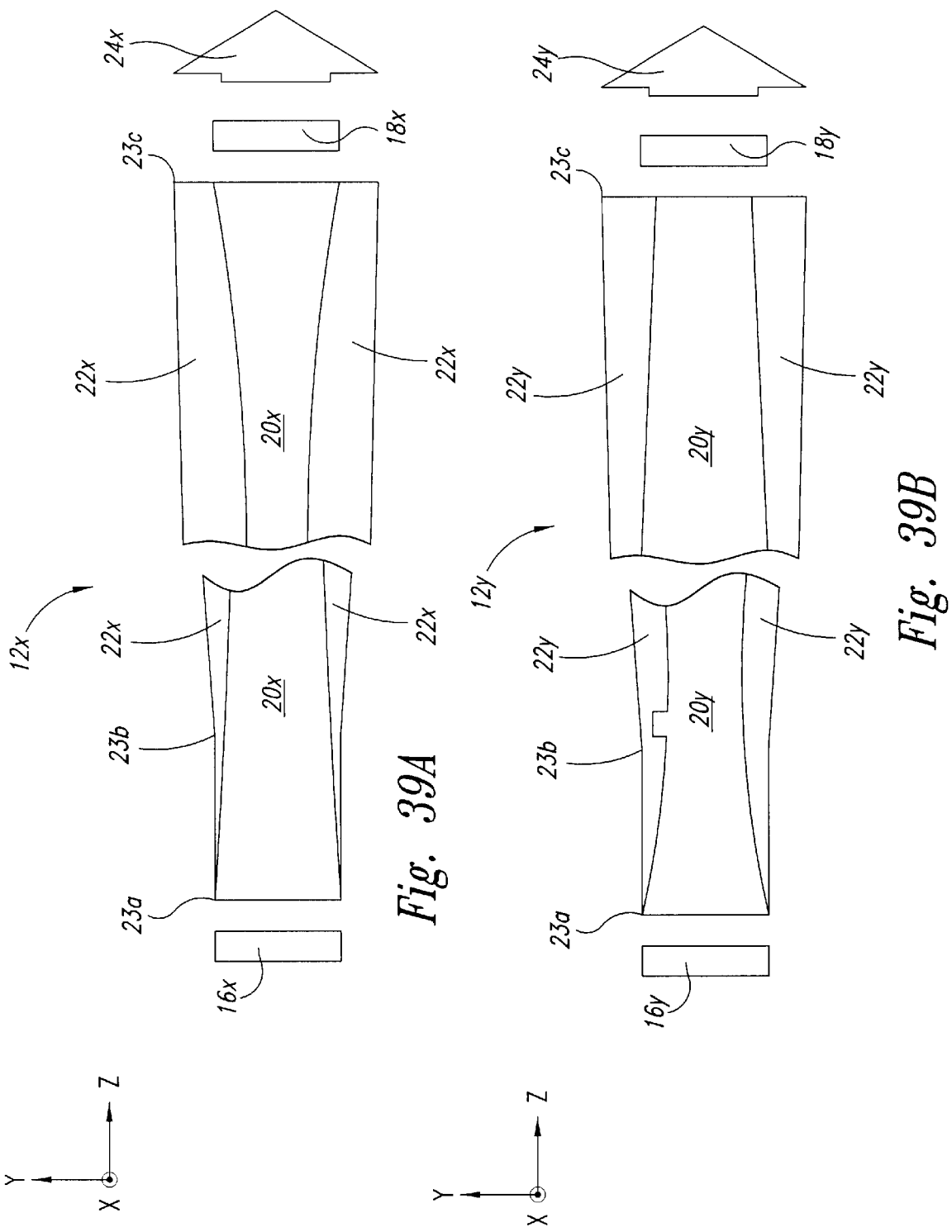

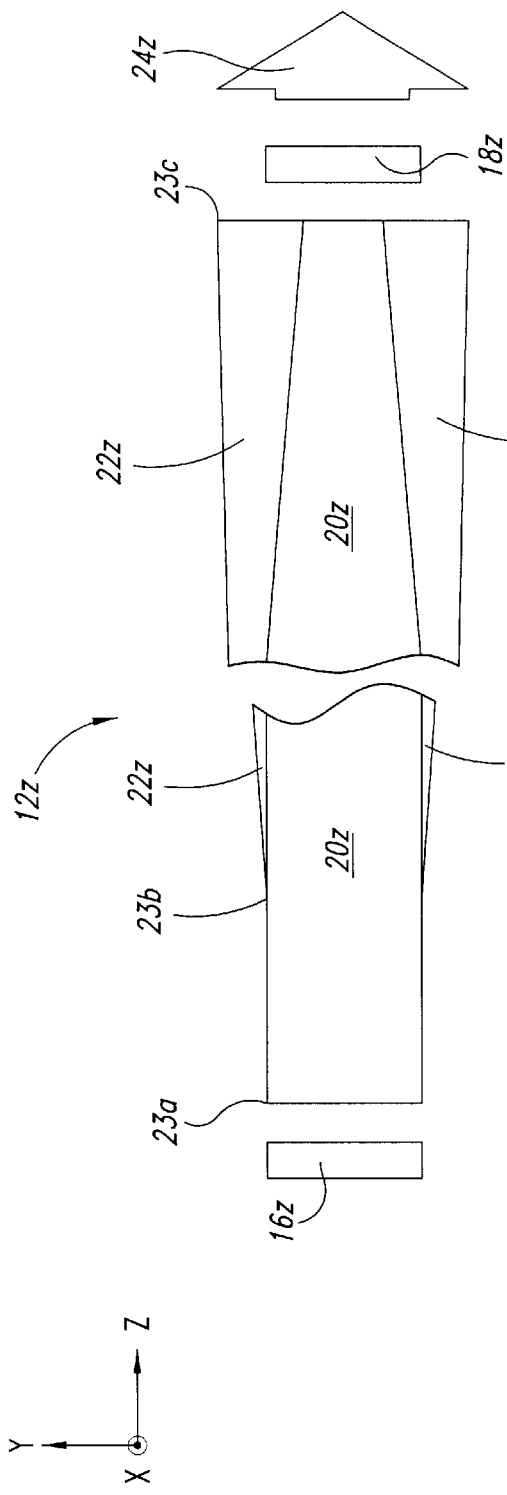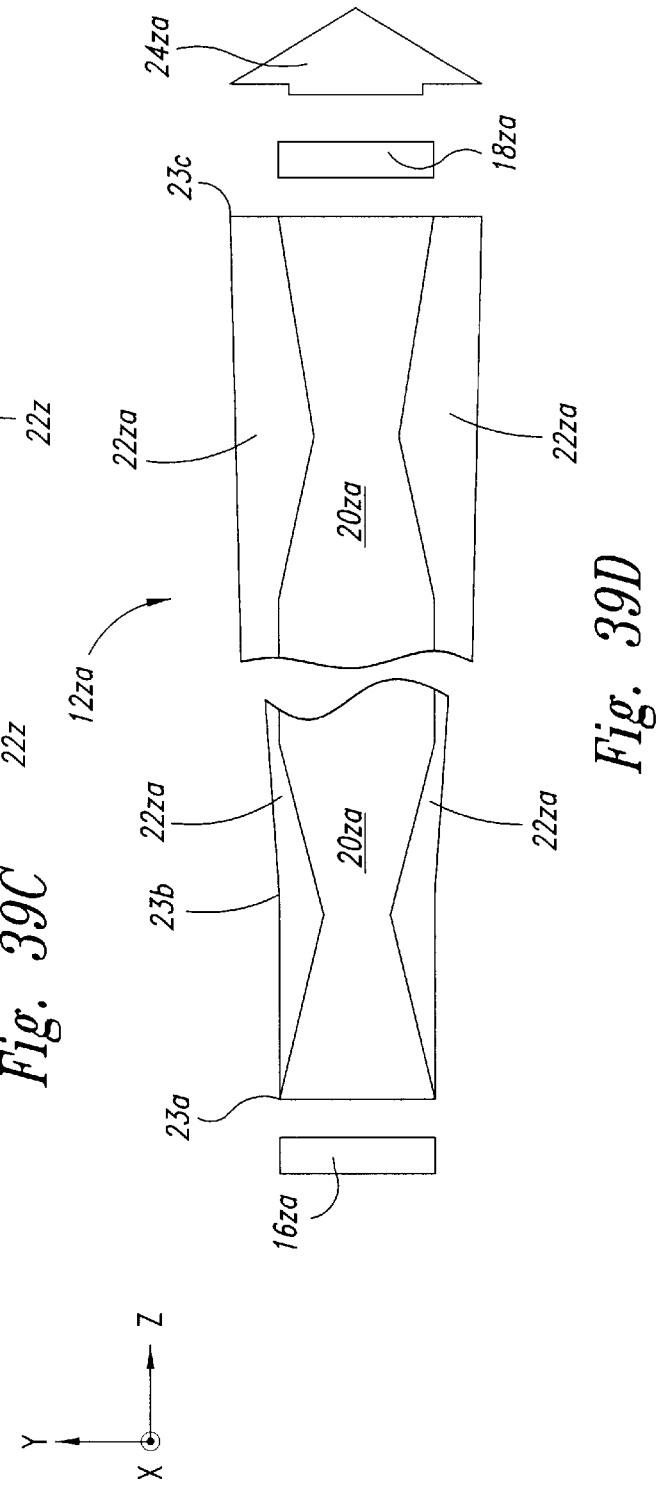

LASER SYSTEM AND METHOD FOR GAIN MEDIUM WITH OUTPUT BEAM TRANSVERSE PROFILE TAILORING LONGITUDINAL STRIPS

CROSS-REFERENCES TO RELATED APPLICATIONS

The present invention is related to commonly assigned and co-pending U.S. application Ser. No. 09/472,733, filed Dec. 27, 1999, entitled "LASER SYSTEM AND METHOD FOR BEAM ENHANCEMENT," now issued as U.S. Pat. No. 6,198,759, and is incorporated by reference.

TECHNICAL FIELD

The present invention relates generally to systems and methods for tailoring transverse profiles of laser beams, and more particularly, to internally incorporating the systems and methods for tailoring transverse profiles of laser beams into resonator cavities and gain media of the lasers.

BACKGROUND OF THE INVENTION

Considerable efforts have been undertaken to improve the performance of lasers with particular attention to physical size, cost, efficiency and device complexity. A prime consideration in achieving these desirable characteristics is that lasers make efficient use of their discharge gain medium.

Conventional methods have included use of optical telescopes inside or outside optical cavities, but these tend to be complex and costly. Other efforts have focused on so-called large-area discharge or slab type lasers to increase efficiencies. These lasers typically have a gain medium 4 disposed between first and second reflector systems 6a and 6b forming a hybrid resonator configuration that is stable in a first dimension, such as the y-axis dimension of FIG. 1, with their gain medium having a narrow thickness in the first dimension to provide waveguide effects. These lasers further typically have an unstable resonator configuration in a second dimension with their gain medium 4 having a wider thickness in the second dimension, such as the x-axis dimension of FIG. 1, to provide free space effects. Both the first and second dimensions generally form a plane transverse to the laser beam path.

Further efforts have been directed at thermal expansion or distortion of key laser components, alignment stability of optical components, improving efficiencies related to size of the gain medium, and using additional mirrors to improve power stability and decrease effects of mirror defects.

Unfortunately, these and other conventional systems and methods share a common problem in that output beams obtained are asymmetrical (usually rectangular or elliptical) and often astigmatic with respect to the plane that is transverse to the laser beam path, such as depicted by the illustrative example of a cross-section of an output laser beam shown in FIG. 1B. Consequently, undesired beam artifacts can occur, such as beam ellipticity, astigmatism, and the presence of a significantly non-Gaussian profile in some transverse beam planes during propagation away from the conventional lasers. These undesired beam artifacts can adversely impact the utility of these conventional systems and methods.

Attempts have been made to address this beam artifact dilemma. For instance, a resonator that is free space in both transverse directions has been used, but requires such a large inter-electrode gap that overall performance greatly suffers. Other attempts take advantage of a low frequency RF drive voltage, however, still promote the extraction of a high aspect ratio, transversely asymmetrical output beam, which suffers from the aforementioned shortcomings.

Given the limited results of prior attempts, conventional wisdom has come to accept that high efficiency configurations of large-area discharge lasers have an undesirable aspect of high aspect ratio, transversely asymmetrical output beams. Those conventionally minded expect that these output beams require reformatting such as to have circular transverse cross-sections, such as depicted by the illustrative example of a cross-section of an output laser beam shown in FIG. 1C. A conventional implementation typically employs a cylindrical optical telescope immediately following the laser output aperture to form a laser beam having a symmetrical cross-section transverse to the beam path. Unfortunately, these conventional remedies add further manufacturing costs and complexity, which would be better avoided if possible.

SUMMARY OF THE INVENTION

A laser system and method for gain medium with output beam transverse profile tailoring longitudinal strips has aspects for producing an output laser beam propagating substantially parallel to a z-axis being parallel to an optical axis, the output laser beam propagating in a space external to the laser. These aspects include front and rear resonator mirrors bounding a resonator cavity, the front and rear resonator mirrors being aligned with respect to the optical axis. Further aspects include a gain medium disposed between and extending toward the front and rear resonator mirrors. The gain medium has a first portion and a second portion. The first and second portions are joined to allow an internal laser beam formed within the gain medium to pass from the first portion to the second portion at a first location. The first portion is shaped to form the internal laser beam to have a first cross-sectional profile in a plane transverse to direction of propagation of the internal laser beam at the first location. The second portion is shaped to form the internal laser beam to have a second cross-sectional profile in a plane transverse to direction of propagation of the internal laser beam at a second location, the second location being where the internal laser beam exits the gain medium. The output laser beam has a cross-sectional profile in a plane transverse to direction of propagation of the output laser beam substantially equal to the second cross-sectional profile of the internal laser beam, the first and second cross-sectional profiles being different. Other features and advantages of the invention will become apparent from the following detailed description, taken in conjunction with the accompanying drawings.

BRIEF DESCRIPTION OF THE DRAWINGS

FIG. 19A is a fragmentary end view of an electrode pair associated with a gaseous gain medium version of the ninth embodiment of the laser of the present invention shown in FIGS. 18A–C.

FIG. 19B is a fragmentary side elevational view of the electrode pair of FIG. 19A.

FIG. 20A is a fragmentary cross-sectional view taken substantially along lines 20A—20A of FIG. 20B of a gaseous gain medium in a discharge region of a tenth embodiment of the laser of the present invention generally depicted in FIG. 1A.

FIG. 20B is a fragmentary side elevational view of the gain medium of FIG. 20A shown with mirrors.

FIG. 22 is a fragmentary side elevational schematic drawing of a gain medium of an eleventh embodiment of the laser of the present invention generally depicted in FIG. 1A shown with mirrors.

FIG. 23 is a fragmentary top plan view of the gain medium of FIG. 22 shown with mirrors.

FIG. 35 is a fragmentary top plan schematic drawing of a gain medium of a nineteenth embodiment of the laser of the present invention generally depicted in FIG. 1A shown with mirrors.

FIG. 36 is a fragmentary side elevational view of the gain medium of FIG. 35 shown with mirrors.

FIGS. 39A–39E are fragmentary side elevational views of gain media of twenty first through twenty fifth embodiments of the laser of the present invention generally depicted in FIG. 1A shown with mirrors.

DETAILED DESCRIPTION OF THE INVENTION

Figure 1:
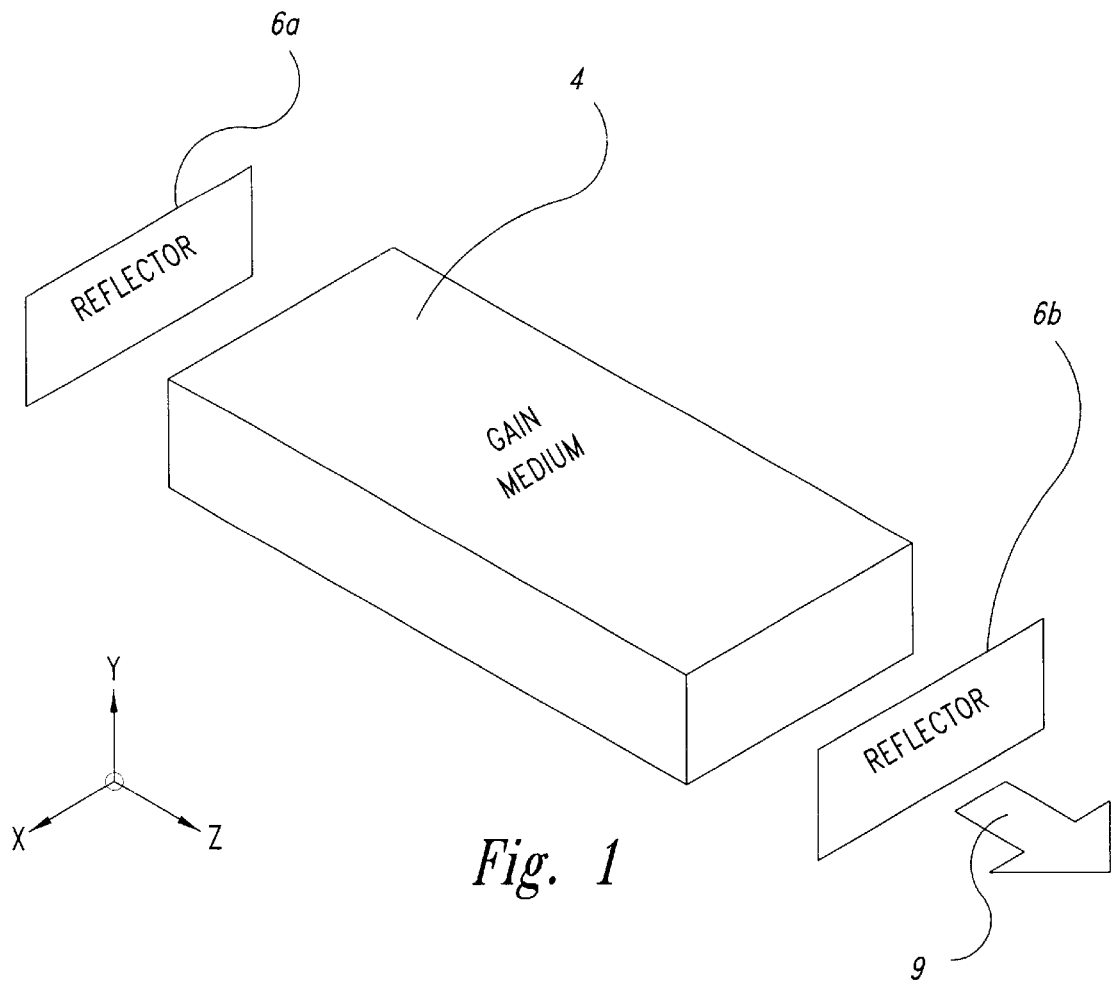
FIG. 1 is a schematic diagram illustrating prior art components of a laser.
Figure 1A:
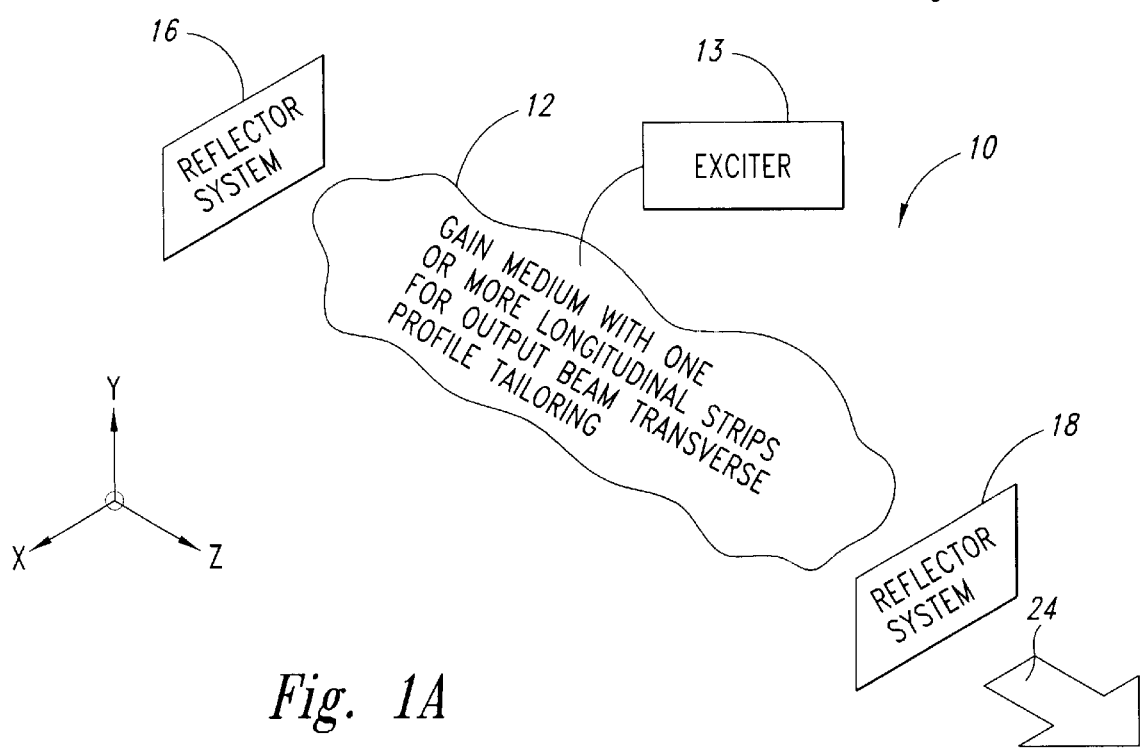
FIG. 1A is a schematic diagram illustrating basic components of a generally depicted laser of the present invention.
Figure 1B:
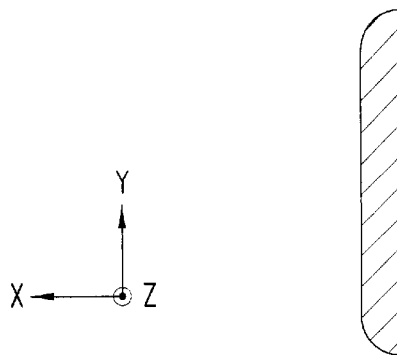
FIG. 1B is a cross-sectional graphical representation of an output beam profile found in the prior art.
Figure 1C:
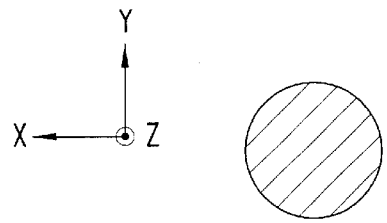
FIG. 1C is a cross-sectional graphical representation of an output beam profile obtained by the present invention, or through using additional post-formation beam correctional systems and methods of the prior art.

As shown in the drawings for purposes of illustration, the present invention is generally embodied in a laser 10 of FIG. 1A having a gain medium 12 with one or more longitudinal strips for output beam transverse profile tailoring (OBTPT). The gain medium 12 is energetically linked to an exciter 13 and is positioned between first and second reflector systems 16 and 18, which typically comprise resonator mirrors. The exciter is used to excite the gain medium 12 and can be any appropriate source including DC, AC, RF, optical, flashlamp, diode pumped, solar, nuclear, chemical, microwave, or any combination thereof either pulsed or continuous wave.

The one or more OBTPT longitudinal strips are disposed substantially parallel to the optical axis being the path of output laser beam 24, which in FIG. 1A is substantially parallel to the z-axis of the gain medium 12. The gain medium 12 can have dimensions in the transverse x-axis and y-axis dimensions that have free-space or waveguide influences upon laser beam formation. For the depicted embodiment, the gain medium 12 is of a thickness to influence laser beam formation as a waveguide along the y-axis and as a free space along the x-axis. Other embodiments have multiple gain media with a common resonator, such as an array of gain medium sections, or several gain medium sections placed in series with one another. Further, the first and second reflector systems 16 and 18 are so configured as to form a stable resonator in the x-axis and an unstable resonator in the y-axis. Other embodiments have resonators that are stable in both the x-axis and the y-axis.

The laser 10 has the gain medium 12 of suitable material that may be, for example, a solid state laser crystal or a gas mixture of appropriate constituents shaped by an enclosure. The gain medium 12 is excited by the exciter 13 in a fashion consistent with common practice to induce a population inversion conducive to laser action. This excitation may involve optical pumping via flashlamps or laser diodes in the solid state case, and typically direct pumping through some form of electrode structure in a gas laser device. The first and second reflector systems 16 and 18 are individually either totally or partially reflecting surfaces, with at least one element placed at each end of the gain medium 12 as shown such that they define a resonator cavity for the optical radiation. Further reflector systems having either totally or partially reflecting surfaces may also be included in alternative embodiments. In the depicted embodiment, a vacuum enclosure is used to contain the gain medium 12 since the gain medium is gas. In other embodiments other appropriate housings are used for the gain medium 12 when the gain medium is solid state. Some form of cooling of the gain medium 12 is typically used and can take many forms, including liquid or gas flow through or within structures comprising the laser 10 for conduction cooling, or various convection and radiation methods and systems.

Figure 1D:
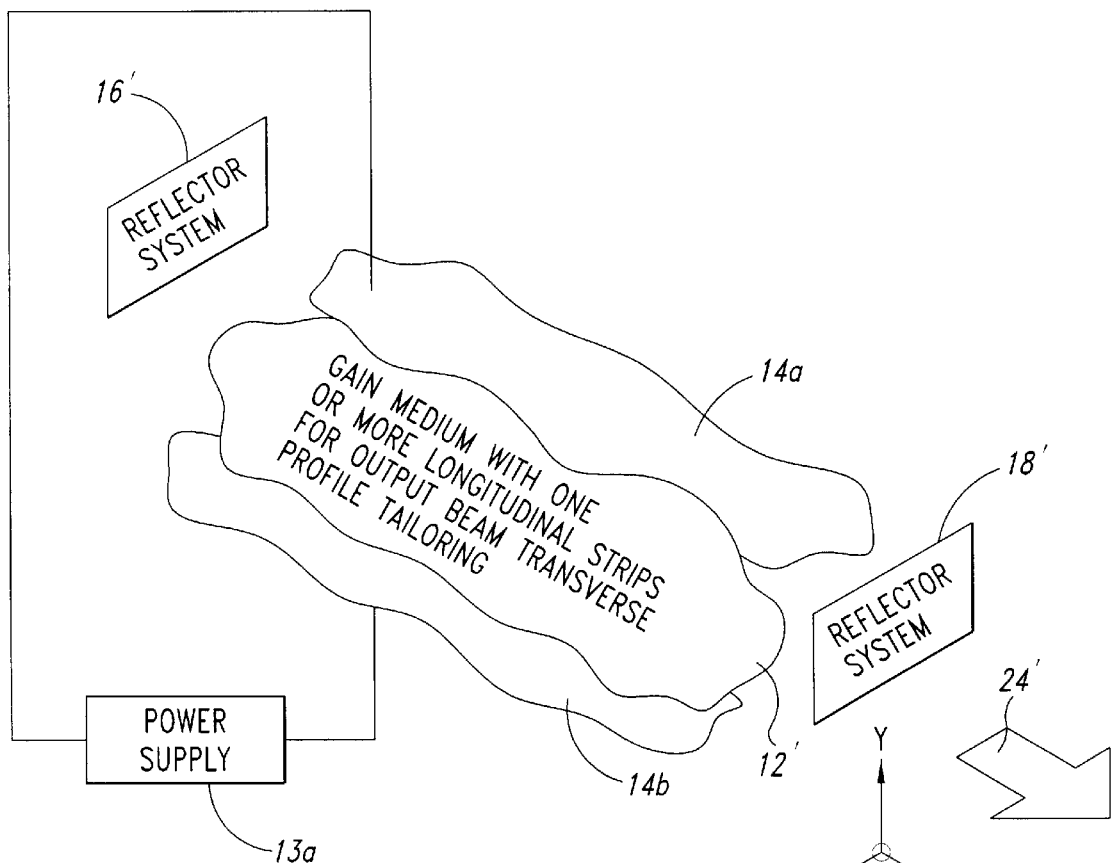
FIG. 1D is a schematic diagram illustrating basic components of a gas medium version of the generally depicted laser of the present invention of FIG. 1A.

In a depicted embodiment using gas for a gain medium 12' is generally depicted by FIG. 1D having first and second electrodes 14a and 14b to contain the gas and provide excitement in the discharge region located between the first and second electrodes to that portion of the gaseous gain medium in the discharge region in conjunction with the power supply 13a. The first and second electrodes 14a and 14b are generally represented in FIG. 1D such as to give overall perspective of the electrodes in relation to other major components of the depicted embodiment, but are not intended to convey specific detail as to electrode shape. In the following descriptions many figures are provided of the gain medium 12 as examples of various shapes that the gain medium can take in various embodiments whether a solid or that portion of a gaseous gain medium in a discharge region. Most of these representations of the gain medium 12 depict the gain medium as either gas or other than gas, such as solid state. In the embodiments having gas as the gain medium 12, the first and second electrodes 14a and 14b would be shaped to match the profile of the shape of the portion of the gain medium in the discharge region between the electrodes shown and/or described herein. For sake of clarity, corresponding electrodes were not shown for each gain medium shape shown in the figures. Instead a few electrode examples corresponding to gain medium shapes are provided since generally those skilled in the art would know how to shape electrodes to contain a gaseous gain medium to a particular shape.

In the depicted embodiment, spacing of the first and second electrodes 14a and 14b associated with at least those portions of the gain medium 12 other than the one or more OBTPT longitudinal strips is such that the optical radiation travels in a waveguide manner within at least the y-axis dimension. A commonly recognized definition of waveguiding uses the condition that $\pi N \leq 1$, where N is the Fresnel number of the device. (D. R. Hall and C. A. Hill, "Radiofrequency-Discharge-Excited $CO_2$ Lasers", in Handbook of Molecular Lasers, edited by P. K. Cheo, Marcel Dekker, Inc., New York, N.Y., 1987, chapter 3, p.165–258.) Therefore, for waveguide embodiments, spacing between the first and second electrodes 14a and 14b for at least those portions of a gaseous gain medium 12' other than the one or more OBTPT longitudinal strips or for the y-axis thickness for at least those portions of a solid state gain medium other than the one or more OBTPT longitudinal strips is chosen so that the Fresnel number, N, for the particular laser configuration satisfies the condition, $N \leq 1/\pi$.

Other embodiments use a larger y-axis spacing of the first and second electrodes 14a and 14b slightly greater than used for waveguides. For instance, this technique may also be applied to so called hybrid structures, with a Fresnel number ranging up to ~1.0 for the y-axis thickness for at least those portions other than the OBTPT longitudinal strips of the gain medium 12, although physical size constraints and construction methods may make these devices less practical to realize. In the depicted embodiments, typical electrode lengths along the z-axis are up to 1 meter, widths along the x-axis are up to 0.5 meters, and discharge gaps along the y-axis are on the order of 1–5 mm. Due to drawing limitations, generally the figures are fragmentary views that show partial sections of the depicted embodiments with respect to the x-axis and the z-axis. Another criterion of the depicted embodiment for the gain medium 12 generally relates to its length:width ratio of the z-axis length to x-axis width, which for the depicted embodiment is on the order of 5:1–20:1 (not shown). In other embodiments, actual gap sizes, lengths and length:width ratios are varied, but still provide structures that fall within the above specified Fresnel number range for the thickness of the gain medium with respect to the y-axis.

As stated, a conventional large-area discharge laser structure generally has a waveguide y-axis electrode gap or thickness in the gain medium 12 that produces a highly asymmetrical output beam. This asymmetrical output beam has significant differences in both x-axis and y-axis dimensions transverse to the output beam path along the z-axis with respect to the size of the transverse output beam profile in the plane formed by the x-axis and y-axis as well as associated beam divergences with respect to the x-axis and y-axis directions.

A general approach of the present invention is to contour the thickness in the y-axis dimension with one or more OBTPT longitudinal strips of the gain medium 12 having narrow widths in the x-axis dimension wherein the y-axis thickness of the one or more OBTPT longitudinal strips varies to a certain degree along the longitudinal z-axis dimension to provide an output beam that is symmetrical or another predetermined shape in both transverse x-axis and y-axis dimensions. In effect, the one or more OBTPT longitudinal strip portions of the gain medium 12 guides the beam 24 allowing it to change shape in the y-axis dimension, such as expanding, to shape the output beam to the desired transverse profile such as having a symmetrical profile in the x-y plane formed by the x-axis and the y-axis. Also the one or more OBTPT longitudinal strip portions of the gain medium can be used to reduce power density of the laser beam, which in turn reduces the propensity of the laser beam to damage optical surfaces by reducing the intensity of optical radiation on these optical surfaces.

For embodiments using a solid state laser crystal for the gain medium 12, the solid state crystal itself is formed or machined into the appropriate shape and consequently defines a gain region. For a gas laser system, such as with one of the depicted embodiments, the first and second electrodes 14a and 14b are used to bound at least some of the surfaces of the gain medium 12', being a gas, to a discharge region with a desired shape. The embodiments using gas mixtures for the gain media may allow the gas mixtures to flow in areas other than the discharge regions of the lasers, however, for illustrative purposes, only those portions of the gain media depicted in the various embodiments described below that are disposed within the laser discharge regions are illustrated in the associated figures. Thus, the gain media for solid state lasers would be entirely illustrated in the figures for the various embodiments, whereas for gas lasers, only those portions of the gain media that are disposed within the discharge regions of the lasers as defined by electrode configuration are illustrated in the associated figures.

It should be noted that, although a symmetrical beam is a principal aspect of the depicted embodiment, other embodiments may use one or more OBTPT longitudinal strips to otherwise tailor the x-y transverse profile of the output beam 24. For example, a 2:1 or a 0.75:1 x-y aspect ratio may be more desirable, for instance, in laser applications involving material processing. In effect, the one or more OBTPT longitudinal strips add another degree of freedom to the design of the laser 10 such that overall device efficiency and performance need not be sacrificed for the sake of more advantageous output beam profiles. Actual values obtainable will depend on overall system design including considerations as to inter-electrode gap or gain medium thickness, electrode length or medium length, and optical radii of curvature among other considerations. For symmetrical output, the x-axis width and y-axis thickness of the taper of the OBTPT longitudinal strip are chosen in combination to provide the desired percentage of the optical radiation to be coupled from the laser cavity for selected device performance. This output coupling value is typically in the range of 2–25% for $CO_2$ gas lasers. For cases using edge coupled resonators a typical upper limit on the x-axis width of an OBTPT longitudinal strip will be on the order of 30% of the total x-axis width of the gain medium 12 in the discharge region for a higher aspect ratio beam, however, other cases also using edge coupled resonators can use OBTPT longitudinal strips with an x-axis width of 50% of the total x-axis width of the gain medium 12 in the discharge region. Other embodiments can use other coupling values or other x-axis widths for the OBTPT longitudinal strips comprising other percentages of the total x-axis width of the gain medium 12.

It must also be emphasized that the one or more OBTPT longitudinal strips of the present invention are vastly different from previously disclosed methods of contouring electrodes to influence the optical mode of a laser device. For example, other variable aperture approaches not teaching nor suggesting the present invention include longitudinally contouring the entire gain medium surface to effect mode control or varying the y-axis gain medium thickness with respect to the x-axis.

Figure 2:
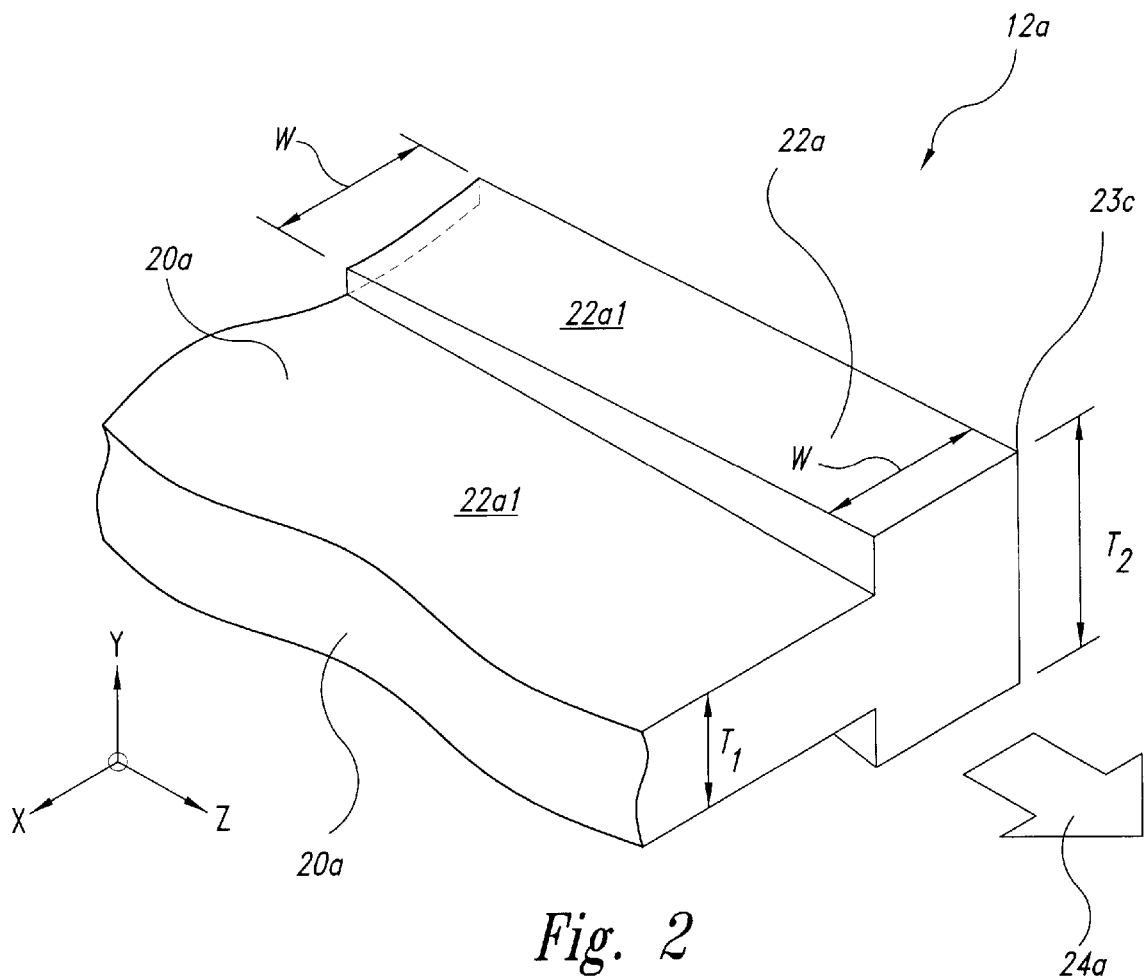
FIG. 2 is a fragmentary isometric schematic drawing of a first embodiment of the gain medium of the laser of the present invention generally depicted in FIG. 1A.
Figure 3A:
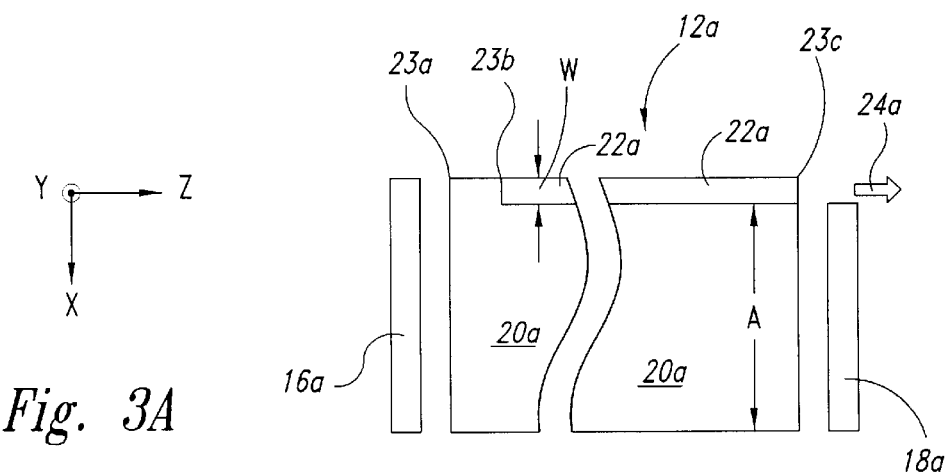
FIGS. 3A and 3B are fragmentary top plan views of the gain medium of FIG. 2 with mirrors shown.
Figure 3B:
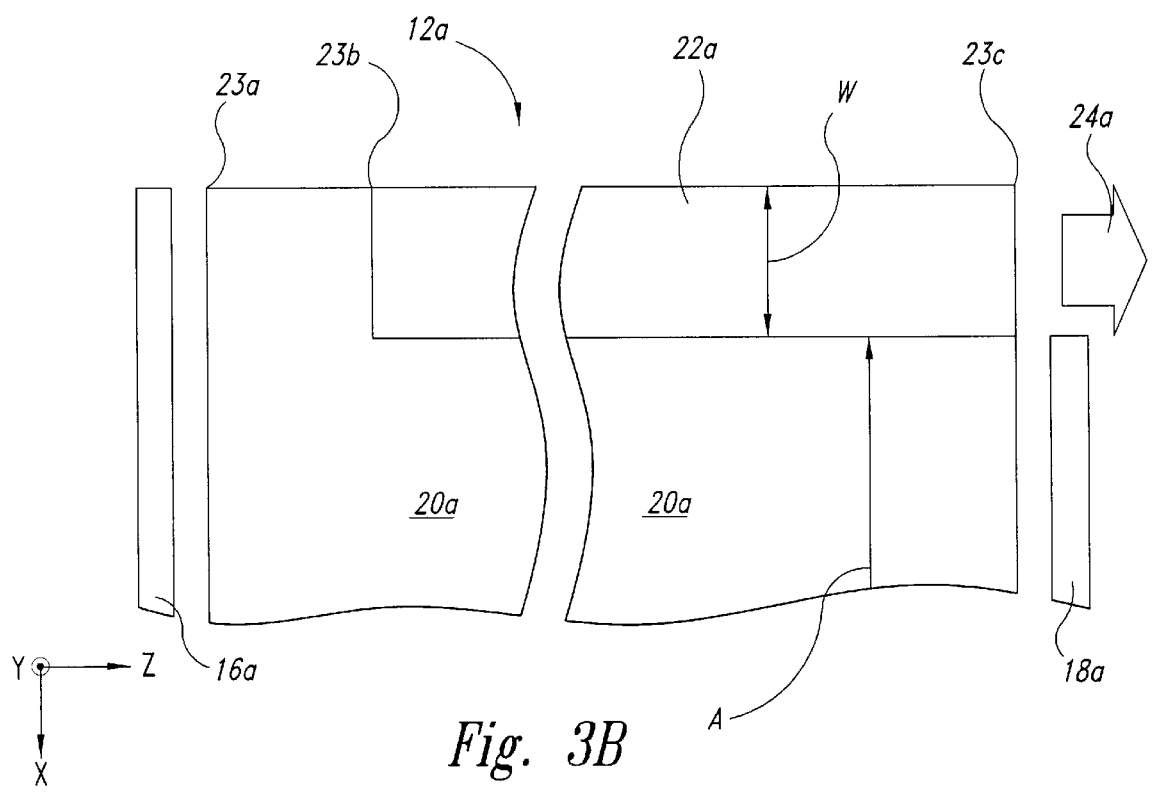
Figure 3C:
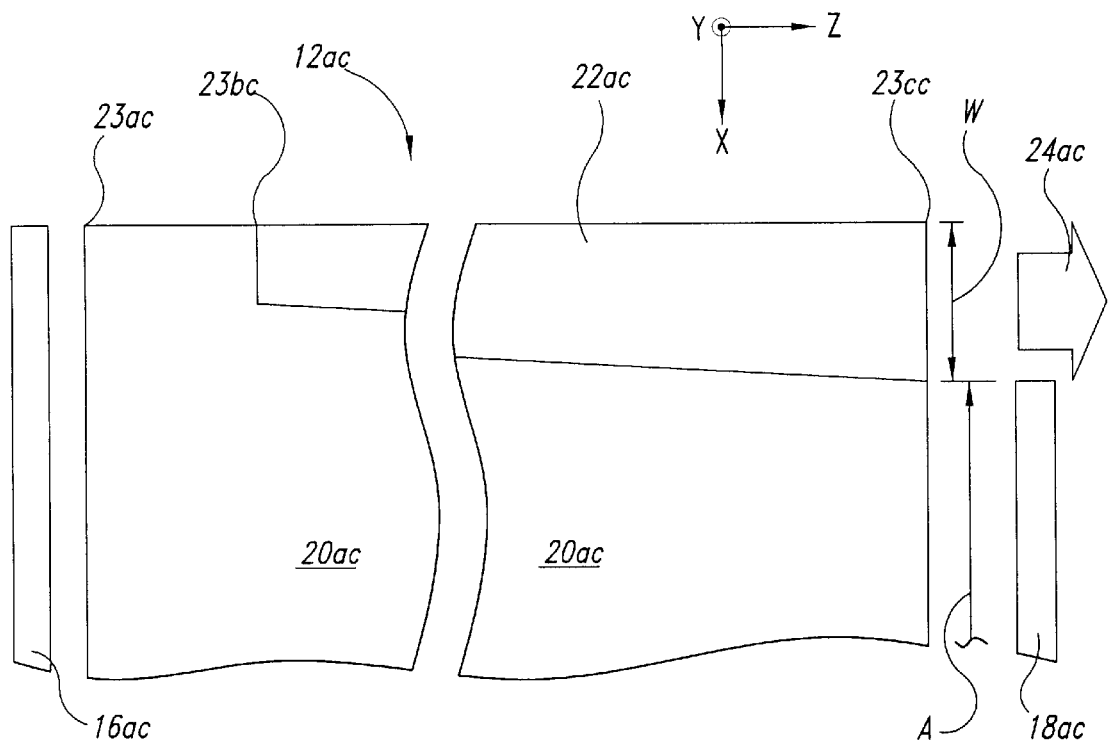
FIGS. 3C, 3D, and 3E are fragmentary top plan views of alternative versions of the gain medium of FIG. 2 with mirrors shown.
Figure 3D:
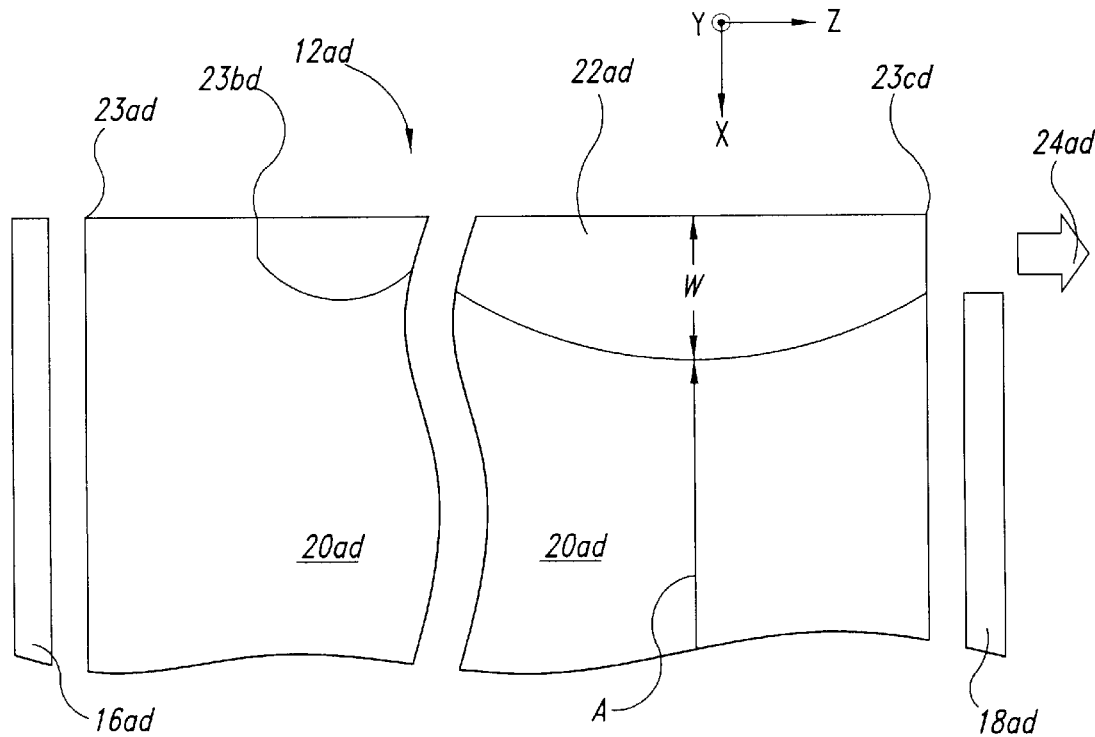
Figure 3E:
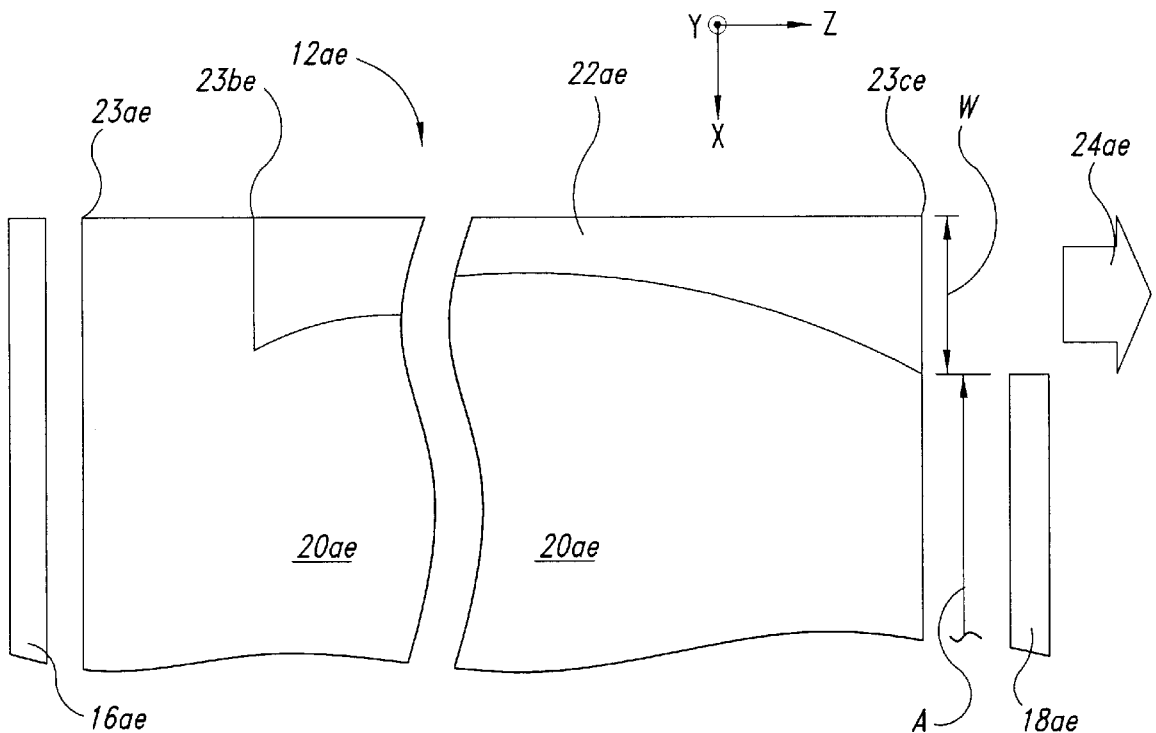
Figure 4:
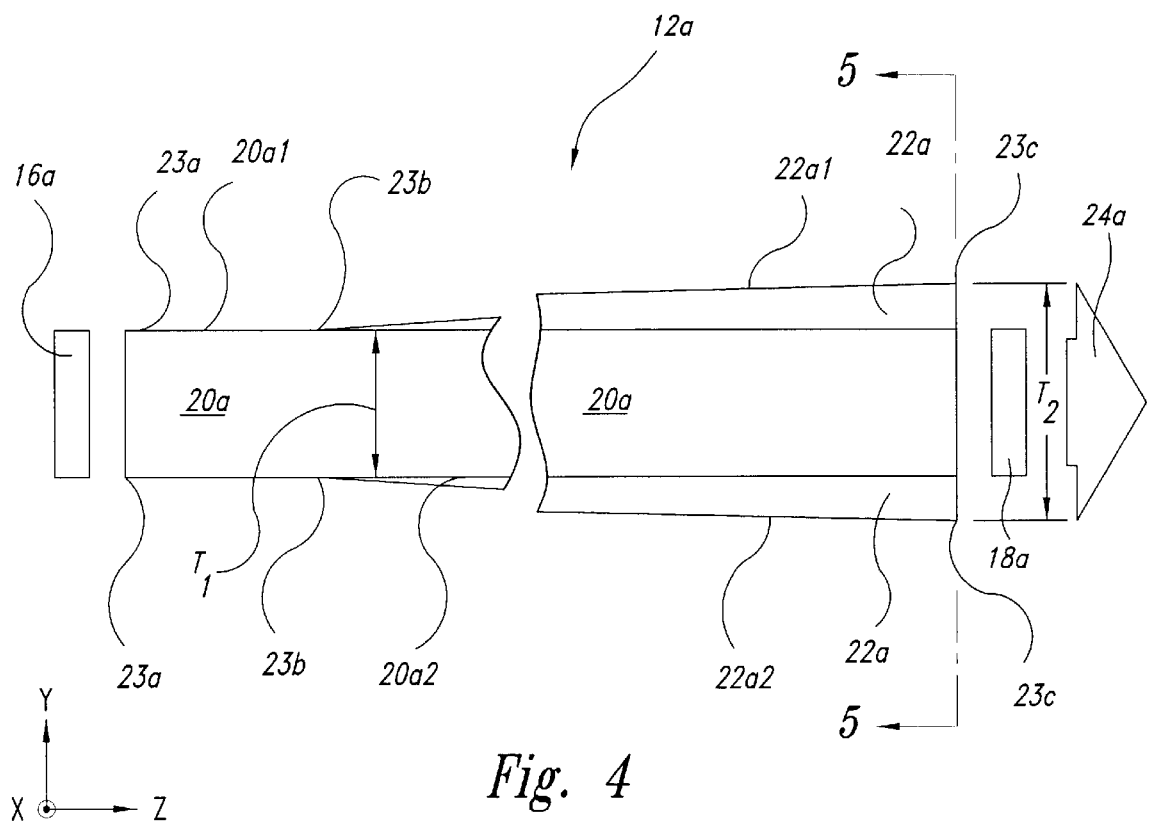
FIG. 4 is a fragmentary side elevational view of the gain medium with mirrors shown in FIG. 3.
Figure 5:
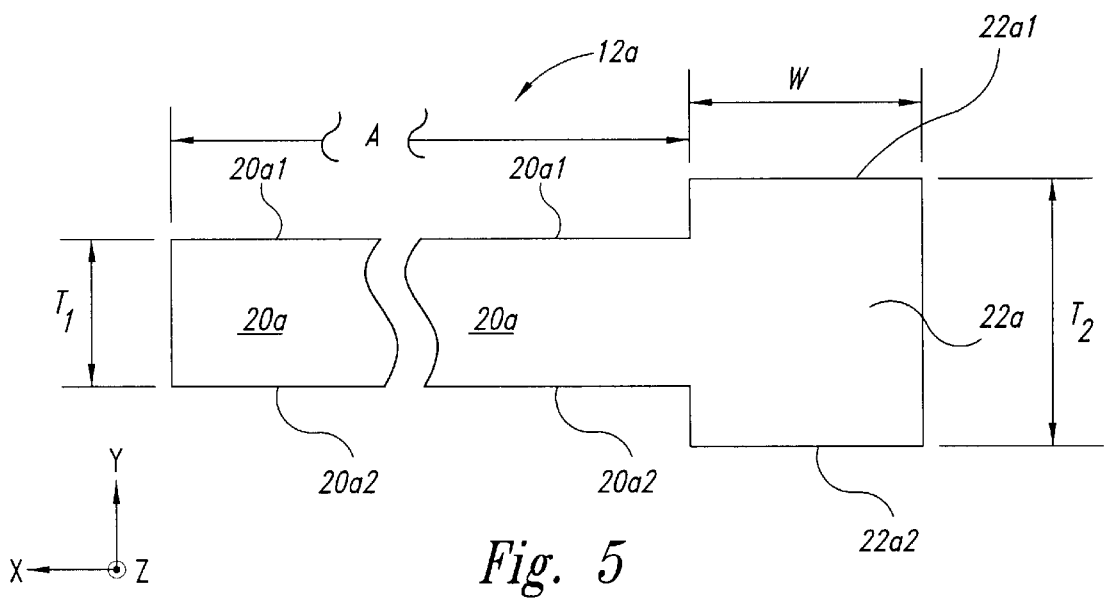
FIG. 5 is a fragmentary cross-sectional view of the gain medium taken substantially along lines 5—5 of FIG. 4.

In a first depicted embodiment of FIGS. 2–3B and 4–5, a gain medium 12a has a main portion 20a with a uniform y-axis thickness of T1 and a first x-z surface 20a1 and a second x-z surface 20a2. Main portions of gain media in other embodiments have varying y-axis thicknesses T1 as discussed further below. As shown in FIGS. 2–5, the first depicted embodiment also has one OBTPT longitudinal elongated portion or strip 22a with an x-axis width of W and a y-axis thickness that varies with position along the z-axis from T1 at z-axis location 23b to T2 at z-axis location 23c. In order for the OBTPT longitudinal strip 22a to increase in y-axis thickness, the OBTPT longitudinal strip has opposing, spaced apart first and second surfaces 22a1 and 22a2, shown in FIG. 4, that are not in the same planes as the first and second x-z surfaces 20a1 and 20a2, respectively, of the main portion 20a of the gain medium 12a. In other embodiments, the OBTPT longitudinal strips increase or decrease in y-axis thickness while maintaining a surface corresponding to one of the first or second x-z surfaces 22a1 or 22a2 in the same plane as a corresponding one of the first or second x-z surfaces 20a1 or 20a2 of the main portion 20a. As shown in FIG. 4, the y-axis thickness of the OBTPT longitudinal strip 22a increases along its z-axis length due to both the first and second x-z surfaces 22a1 and 22a2 diverging from the corresponding ones of the first and second x-z surfaces 20a1 and 20a2 of the main portion 20a. As represented below, other embodiments require only one x-z surface of the OBTPT longitudinal strip 22a to depart from a corresponding one of the x-z surfaces of the main portion 20a in order to vary the y-axis thickness of the OBTPT longitudinal strip along its z-axis.

For the first depicted embodiment of FIGS. 2–5, the x-axis width, W, of the OBTPT longitudinal strip 22a is approximately as wide as the output beam 24a for a given optical coupling for the laser 10. For instance, if the main portion 20a had a narrowest x-axis width of A so that the total x-axis width of the gain medium 12a was A+W and if the optical coupling for the laser 10 is chosen to be 10%, then the x-axis width, W, of the OBTPT longitudinal strip 22a is approximately 10% of A+W since A+W is the entire x-axis width of the gain medium 12a. The y-axis thickness of the longitudinal strip 22a at location 23c is generally dependent upon the x-y aspect ratio chosen for the output laser beam 24a. For example, if a 1:1 x-y aspect ratio is chosen for the output laser beam 24a such that the output laser beam is x-y symmetrical, the y-axis thickness of the longitudinal strip 22a at location 23c will be approximately W. Other embodiments use other ways of determining the x-axis width of the OBTPT longitudinal strip 22a. For instance, one method substantially equates the x-axis width of the OBTPT longitudinal strip 22a to less than or equal to the product of twice the wavelength of the output laser beam 24 multiplied by the length of the OBTPT longitudinal strip from the location where the OBPTPT longitudinal strip is narrowest (in this case at location 23b) to location 23c. This product is then divided by the narrowest y-axis thickness of the OBTPT longitudinal strip 22a (in this case at location 23b). Alternatively, an upper limit for the x-axis width of the OBTPT longitudinal strip 22a may be specified by employing well known optical beam propagation equations to tailor and confine the beam as desired.

For instance, an alternative use of beam propagation equations involves calculation of how the laser beam expands within a resonator cavity from one end to the other with the Equations 1 and 2 below taken from N. Hodgson and H. Weber, *Optical Resonators: fundamentals, advanced concepts and applications*, Springer-Verlag, London, 1997, chapter 2, p. 54–114. In other words, using this equation would allow determination of an upper limit of how large the output beam 24a would be at the output end of the resonator cavity and hence, the x-axis width of the OBTPT longitudinal strip 22a would then be chosen to be at least somewhat less than this upper limit to ensure that the beam was still guided as it propagated.

$$d(z) = d_o(1+(z/z_o)^2)^{1/2} \qquad (1)$$

$$z_o = \pi(d_o)^2/\lambda \qquad (2)$$

Here $d_o$ is the initial beam waist radius; z is the distance from initial beam waist; $d(z)$ is the beam waist radius at distance z; and $\lambda$ is the wavelength of radiation for the laser beam.

As shown in FIGS. 2 and 4, the y-axis thickness of the OBTPT longitudinal strip 22a increases from location 23b to location 23c in a fairly linear fashion for this first depicted embodiment. Between locations 23a and 23b y-axis thickness of the gain medium 12a is only due to the main portion 20a. Other embodiments have the thickness of the OBTPT longitudinal strip 22a vary in numerous different ways. The x-axis width varies per embodiment depending on factors such as the power output requirements of the laser. This first depicted embodiment, as shown in FIGS. 3A, 3B, and 4, has first and second reflector systems 16a and 18a that are totally reflecting, with an output beam 24a that is edge coupled at location 23c. FIG. 3A shows the entire x-axis length of the gain medium 12a whereas FIG. 3B is the same view as FIG. 3A except that FIG. 3B provides a fragmentary view with respect to the x-axis of the gain medium. Most figures contain fragmentary views to allow for clearer views of the associated OBTPT longitudinal strips.

Alternative versions of the gain medium 12a are shown as gain media 12ac, 12ad, and 12ae in FIGS. 3C, 3D, and 3E, respectively. These alternative versions have OBTPT longitudinal strips 22ac, 22ad, and 22ae that have x-axis widths that vary with respect to the z-axis with a maximum width of W.

Figure 6:
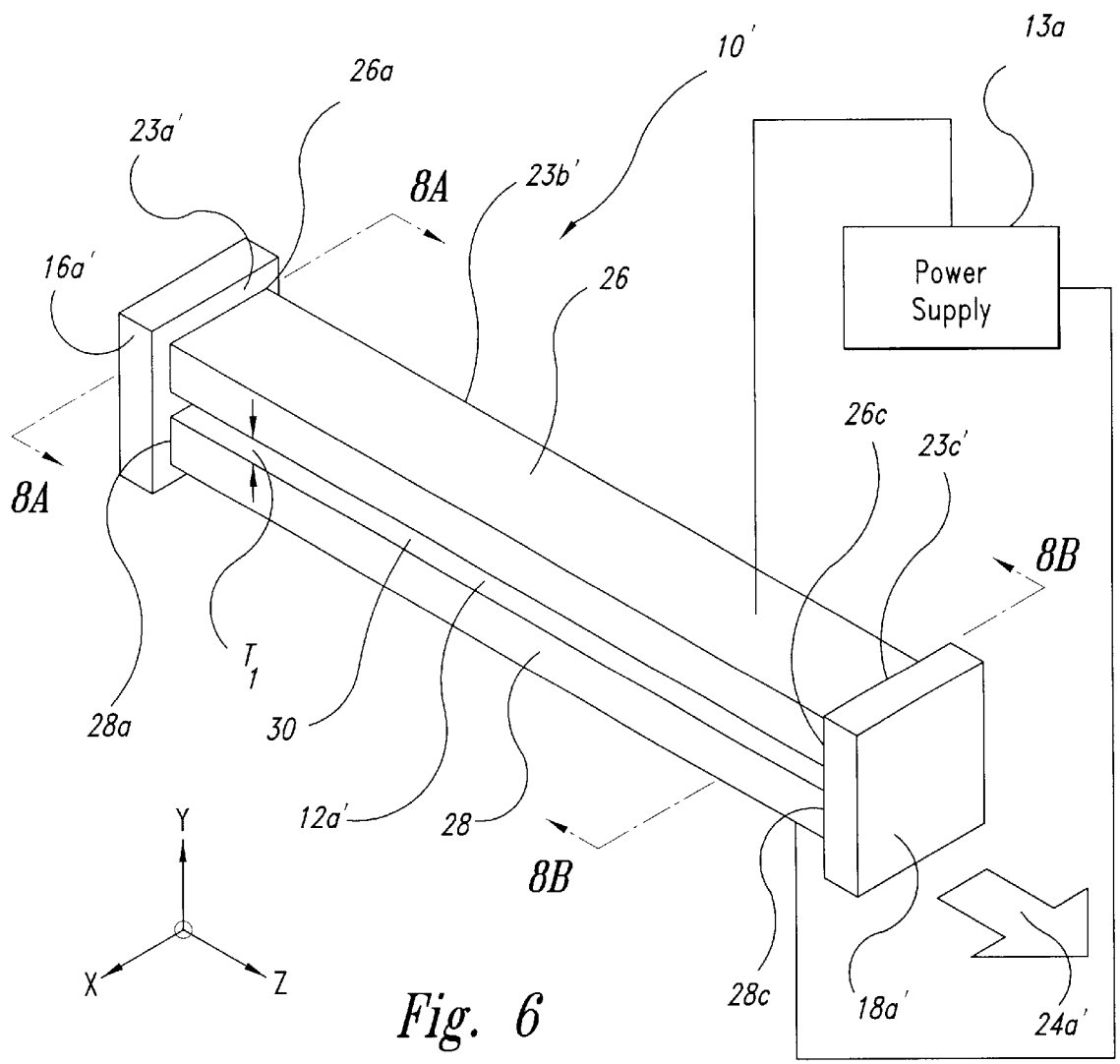
FIG. 6 is an isometric schematic drawing of a gas medium version of the first embodiment of the present invention shown in FIGS. 2–5.
Figure 7A:
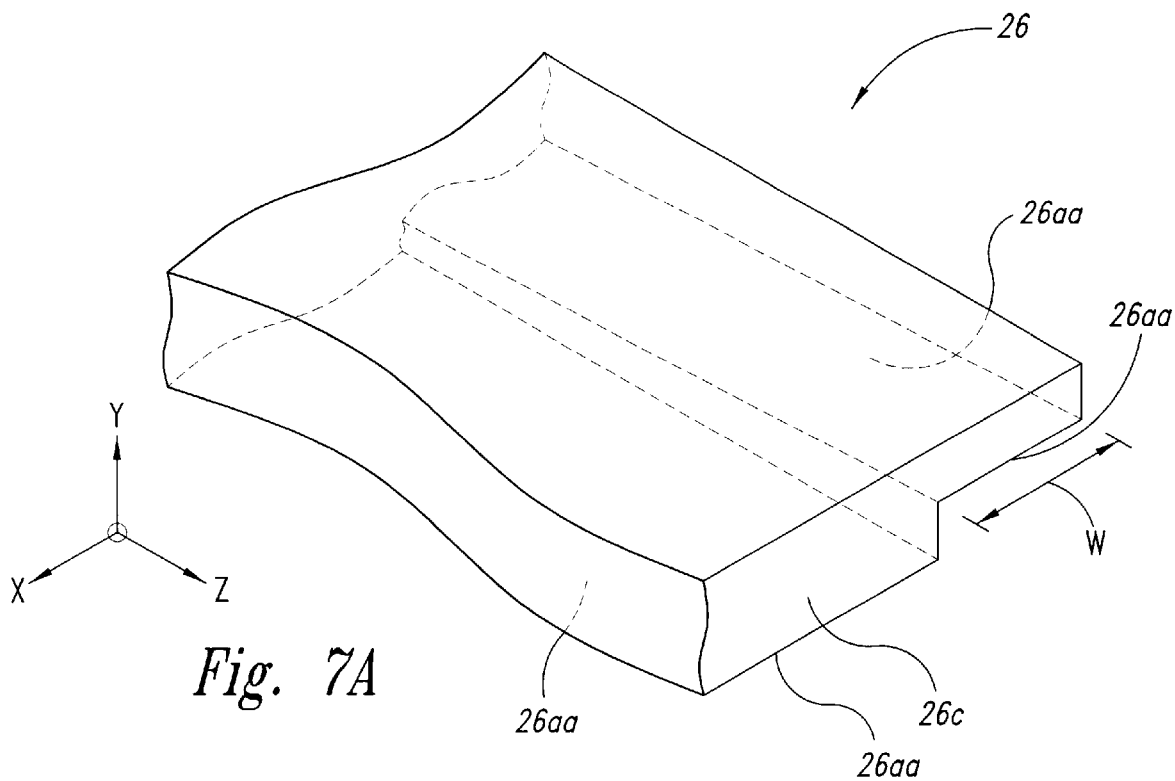
FIGS. 7A and 7B are fragmentary isometric schematic drawings of first and second electrodes of the gas medium version of the first embodiment shown in FIG. 6.
Figure 7B:
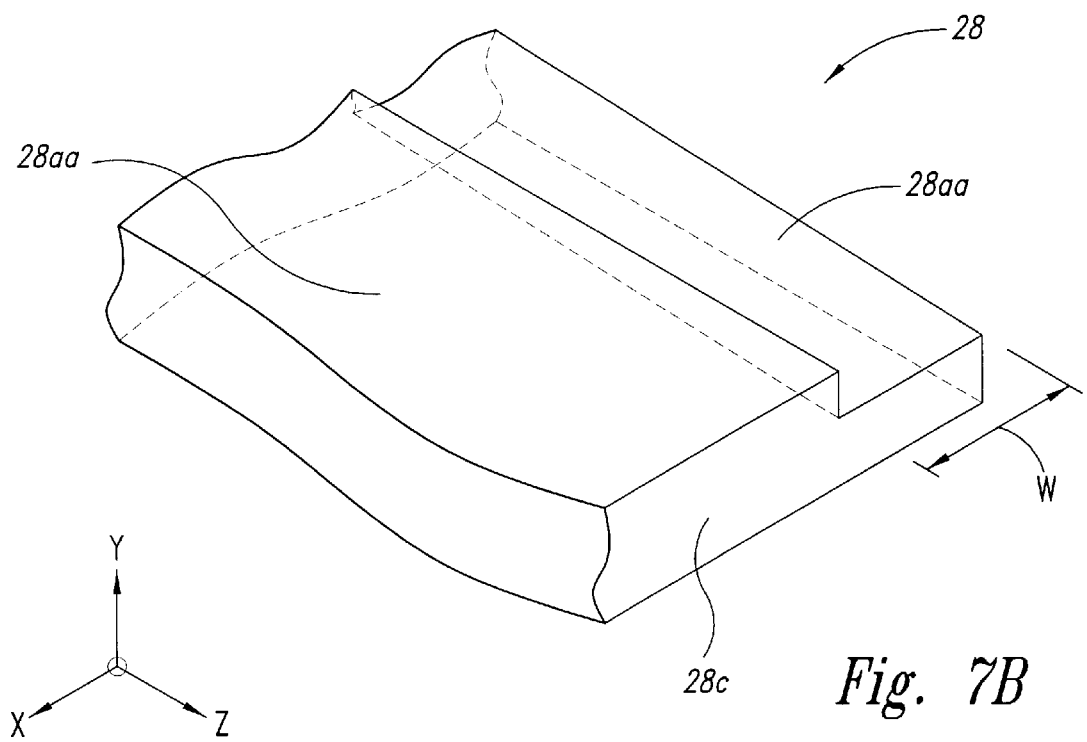

A depicted gas laser embodiment of the gain medium 12a configured as a gaseous gain medium 12a' for a gas laser 10', is shown in FIG. 6. The laser 10' comprises a power supply 13a, first and second resonator mirrors 16a' and 18a', an edge coupled output beam 24a', and first and second electrodes 26 and 28, with the gaseous gain medium 12a' contained in a resonator cavity 30. The first and second electrodes 26 and 28 have tapered notches of width W, as shown in FIGS. 7A and 7B, to form an OBTPT longitudinal strip in the associated gaseous gain medium. A cross-section taken of the first and second electrodes 26 and 28 at their respective end surfaces 26a and 28a, at location 23a' (see FIG. 6), closest to the first resonator mirror 16a', shown in FIG. 8A, has a constant electrode gap, S1, along the x-axis corresponding to the shape of the gain medium 12a for the first embodiment at location 23a'. A main portion 20a' of the gaseous gain medium 12a' corresponding to the main portion 20a of the gain medium 12a is located in the electrode gap S1.

Figure 8A:
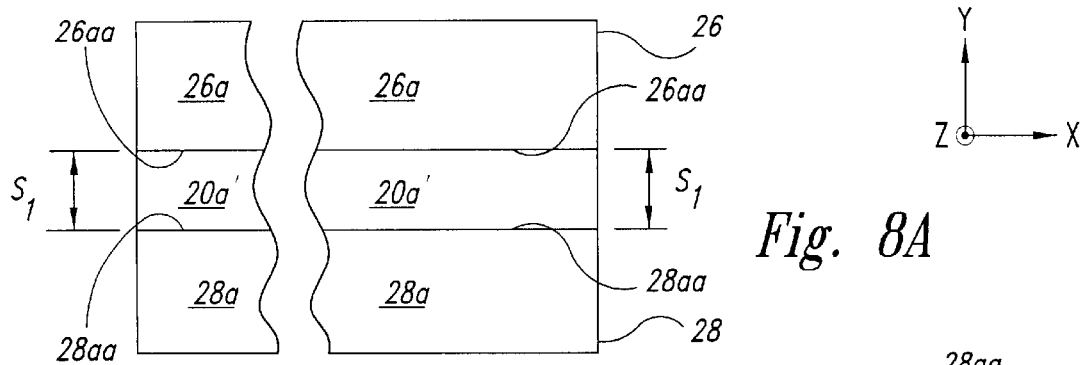
FIGS. 8A and 8B are fragmentary cross-sectional schematic drawings of the electrodes of gas medium version of the first embodiment shown in FIG. 6.
Figure 8B:
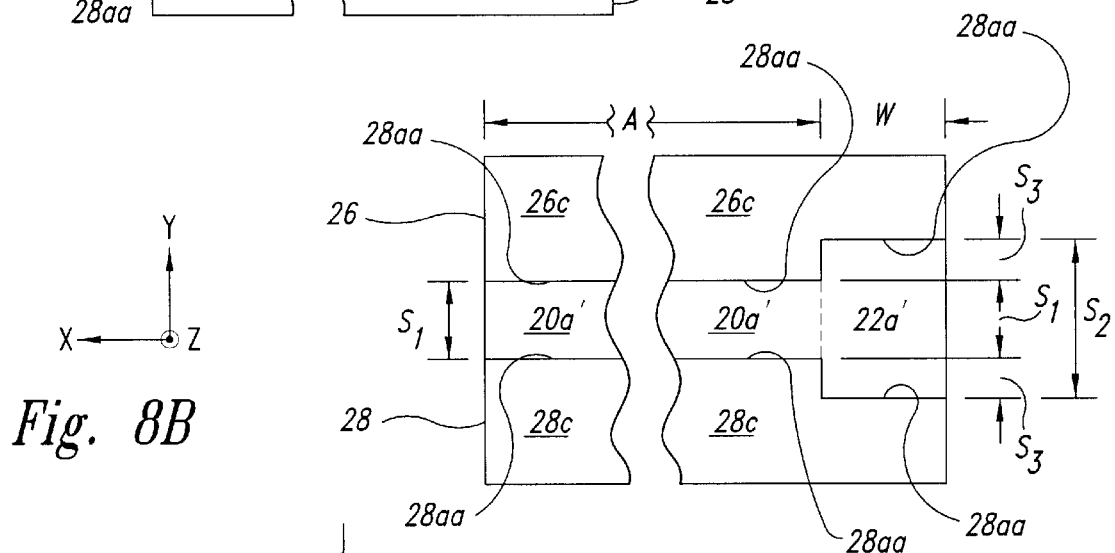

A second cross-section taken of the first and second electrodes 26 and 28 at their respective end surfaces 26c and 28c, at location 23c', closest to the second resonator mirror 18a', shown in FIG. 8B, has the electrode gap S1 along an x-axis width A containing the main portion 20a' of the gaseous gain medium 12a'. The second cross-section also has a second electrode gap S2' along an x-axis width W containing an OBTPT longitudinal strip 22a' of the gaseous gain medium 12a' corresponding to the OBTPT longitudinal strip 22a of the gain medium 12a. Corresponding to the OBTPT longitudinal strip 22a of the gain medium 12a of FIG. 2, the OBTPT longitudinal strip 22a' of the gaseous gain medium 12a' starts at a location 23b', shown in FIG. 6, along the z-axis corresponding to the location 23b along the z-axis of the gaseous gain medium 12a of FIG. 2, with the electrode gap S1, and increases in y-axis thickness in a linear fashion along the z-axis similar to the gain medium 12a until reaching the electrode gap S2 thickness T2 at location 23c' along the z-axis.

In the depicted gas laser embodiment, the first and second electrodes 26 and 28 are 50 cm long along the z-axis, and 50 mm wide along the x-axis, and are so spaced apart to form an elongated discharge region. For the main portion 20a' of the gaseous gain medium 12a', the first and second electrodes 26 and 28 are spaced apart to form an inter-electrode gap S1 of 1.5 mm corresponding to the thickness, T1, for the gaseous gain medium 12a'. The first and second electrodes 26 and 28 form an elongated discharge region for the resonator cavity 30 substantially without sidewalls.

As described the first and second electrodes 26 and 28 are substantially planar and parallel over the discharge region with the exception of the OBTPT longitudinal strip 22a, which is a narrow tapered strip along one edge to correct for the asymmetrical divergence of the output beam in the two orthogonal transverse x-axis and y-axis dimensions. For the depicted gas laser embodiment, the first and second resonator mirrors 16a' and 18a' are concave—concave optical elements that form a negative branch unstable resonator in the wide or free space, x-axis dimension and a plano—concave configuration in the narrow y-axis dimension to form a waveguide resonator. This was accomplished by using a combination of cylindrical and spherical optical elements for the first and second resonator mirrors 16a' and 18a'. The respective radii of curvatures are 499 mm and 554 mm for the first and second resonator mirrors 16a' and 18a' in the unstable x-axis dimension, and 554 mm and infinity for the first and second resonator mirrors 16a' and 18a' in the waveguide direction. Both the first and second resonator mirrors 16a' and 18a' have an optical path length of 526 mm. Other embodiments may use cylindrical optics, spherical optics, toroidal optics, or generally aspherical optics, or any combinations thereof for the resonator mirrors.

The first and second resonator mirrors 16a' and 18a' are mounted to end flanges (not shown) which contain provisions to maintain vacuum integrity whilst still providing suitable adjustment of mirror tilt to enable optimum resonator alignment. Approximately ten percent of the intra cavity optical radiation inside the gaseous gain medium 12a' is coupled out of the gaseous gain medium as the edge coupled output beam 24a' by allowing this fraction of the intra cavity optical radiation to pass unencumbered beyond an edge of the second resonator mirror 18a' and through a ZnSe output window (not shown).

The gaseous gain medium 12a' has a standard gas mixture of 1:1:3=$CO_2 \cdot N_2 \cdot He$ with the addition of 5% xenon. Gas pressure of the gaseous gain medium 12a' is maintained between 30 and 150 Torr with a typical pressure of 100 Torr. Other gas mixtures and pressures may be more suitable for other inter-electrode discharge gaps, as is well known to one skilled in the art. For instance, other embodiments use various combinations of gases or their isotopes comprising any or all of the following: carbon dioxide ($CO_2$), nitrogen ($N_2$), helium (He), xenon (Xe), oxygen ($O_2$), carbon monoxide (CO), hydrogen ($H_2$), water ($H_2O$), neon (Ne), krypton (Kr), argon (Ar), fluorine (F), and deuterium (D). Other embodiments use gain medium of metal vapor comprising one or more of the following components: copper, gold, strontium, barium, cadmium, and their halide compounds and other metal vapor elements.

The power supply 13a generates radio frequency energy that provides electrical excitation to the gaseous gain medium 12a' via a matching network directly coupled to the first and second electrodes 26 and 28. The power supply 13a operates at a frequency of 80 MHz with an output power level of at least 4 kW. Other embodiments may use other excitation frequencies and power levels. The power supply 13a is electrically connected to the electrodes in a biphase fashion such that the phase of the voltage on the first electrode 26 is shifted substantially 180 degrees relative to the voltage on the second electrode 28. This is accomplished by the placement of inductors (not shown) between the electrodes of suitable value.

The first and second electrodes 26 and 28 are mounted in an aluminum outer housing to provide vacuum integrity as well as shielding for the RF radiation. To facilitate efficient operation, the housing is fitted with cooling fins or water channels to sufficiently dissipate the heat from the inner structure. Generally more cooling is necessary for efficient operation as power supply power levels increase. Alumina ceramic spacer pills (not shown), which account for less than 5% of total electrode surface area, are placed between the first electrode 26 and the outer housing and between the second electrode 28 and the outer housing to provide electrical insulation between the electrodes and the outer housing.

As compared to a conventional laser without one or more OBTPT longitudinal strips, which produces an asymmetric output beam with significantly differing beam size and divergence in the two transverse dimensions of the output beam, the depicted gas laser embodiment having the OBTPT longitudinal strip 22a' corrects for this deficiency and produces the output laser beam 24a' which is substantially symmetrical in both x-y cross-sectional size as well as angle of divergence.

For the depicted gas laser embodiment, calculations were performed to determine the beam size expected from the device at various locations using the aforementioned specific details of this design. These calculations indicate that $\pi d$, where d is the equivalent beam waist, increases from approximately 1.65 mm to approximately 10.4 mm as the beam propagates from the first resonator mirror 16a' to the front aperture by the second resonator mirror 18a'. The multiplicity factor of $\pi$ is included as an accepted way of ensuring that virtually 100% of the energy contained within the optical beam is accounted for. Therefore, based on these calculations, a symmetrical output aperture of 5 mm×5 mm was chosen to help ensure that the beam would always be "guided" by the electrode surfaces.

This was physically implemented as shown in FIGS. 7–8 by placing a tapered section symmetrically down one side of each electrode surface of first and second electrodes 26 and 28. This longitudinal taper is symmetrical in both electrodes and has a constant linear variation such that it starts out flush at one end of the electrode, as shown in FIG. 8A, and progressively increases until there is a 1.75 mm depression S3, as shown in FIG. 8B, at the opposite end of the same electrode causing the total electrode gap of S2 to be 5.0 mm in this instance. The gaseous gain medium is shaped similarly to the gain medium 12a shown in FIG. 2. As evident from the electrodes 26 and 28 of FIGS. 7–8, this region of the OBTPT longitudinal strip 22a' is flat in the transverse x-axis dimension and also has an abrupt step as a transition between the planar main portion 20a' and tapered electrode regions of the OBTPT longitudinal strip.

Although the taper to form the OBTPT longitudinal strip 22a' of the gaseous gain medium 12a' is placed symmetrically in both electrodes in this instance, other embodiments may have a taper in only one electrode, for example, and may also take the form of other, non-linear contours in the transverse dimension, and/or include tapered or chamfered edges between the parallel main portion and tapered OBTPT longitudinal strip electrode sections. When assembled, the inter-electrode y-axis gap region of 1.5 mm plus the 1.75 mm y-axis step associated with the OBTPT longitudinal strip in each electrode gives a symmetrical, square output aperture from the waveguide of 5×5 mm$^2$ at the z-axis location 23c'. The first and second electrodes 26 and 28 have inner electrode surfaces 26aa and 28aa, respectively, that are also lightly polished to help facilitate waveguiding within the gap formed between the electrodes and reduce the optical losses experienced by laser radiation during oscillation within the resonator cavity 30.

The output beam obtained from a conventional planar slab laser has an asymmetrical nature with a divergence in the wide x-axis dimension of approximately 2.1 mrad and in the narrow y-axis, inter-electrode dimension of approximately 7.1 mrad. From these divergences, it would be expected that at a distance of approximately 1 m from the laser, the output laser beam from the conventional planar slab laser would have dimensions on the order of 8×20 mm$^2$ and have been confirmed by direct measurement. In contrast, a gas laser with an OBTPT longitudinal strip 22a' would be expected to have a symmetrical output beam with uniform divergences in both transverse x-axis and y-axis dimensions. For the depicted gas laser embodiment, the output laser beam 24a' was measured at approximately 1 m from the laser and found to be approximately 8 mm in both x and y transverse dimensions.

Figure 9:
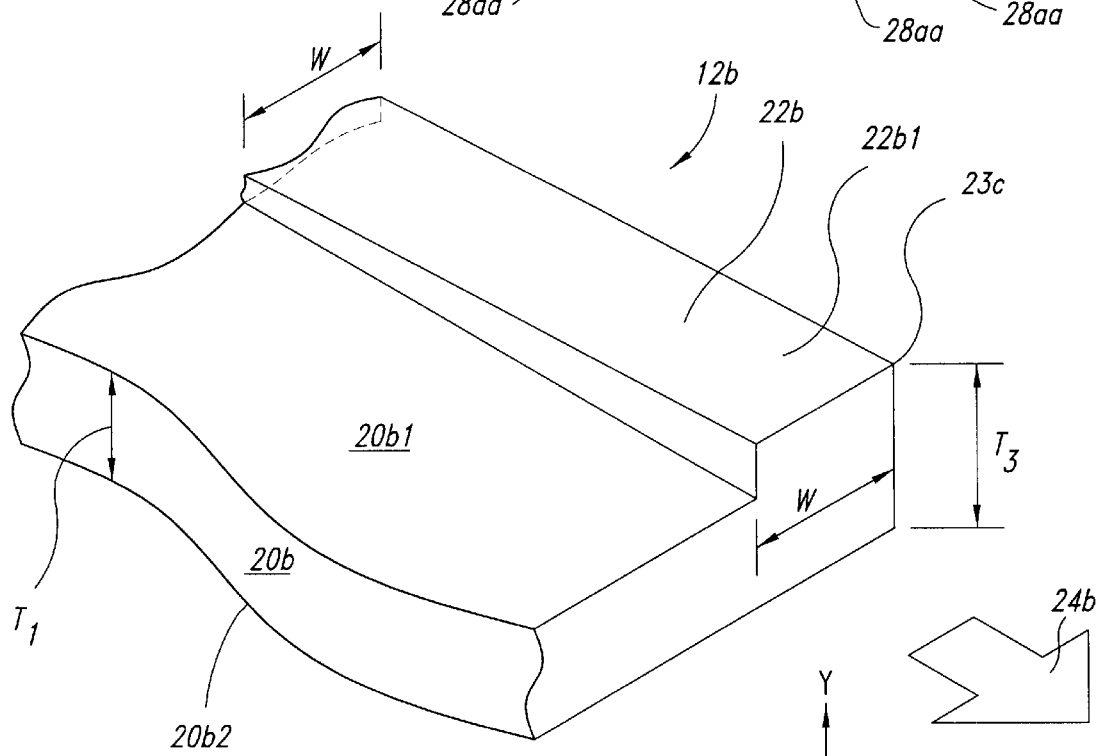
FIG. 9 is a fragmentary isometric schematic drawing of a gain medium of a second embodiment of the laser of the present invention generally depicted in FIG. 1A.

The OBTPT longitudinal strip 22a of the gain medium 12a of the first depicted embodiment of FIG. 2 increases in thickness by departing from both the first x-z surface 20a1 and the second x-z surface 20a2 of the main portion 20a of the gain medium. Other OBTPT longitudinal strips of other embodiments may remain in one of the surface planes of the main portion of the gain medium. For instance, a second depicted embodiment shown in FIG. 9 has a gain medium 12b with a main portion 20b having first and second x-z surfaces 20b1 and 20b2 and a OBTPT longitudinal strip 22b having first and second x-z surfaces 22b1 and 22b2. For this second depicted embodiment, the second surface 22b2 of the OBTPT longitudinal strip 22b remains in the same plane of the second x-z surface 20b2 of the main portion 20b.

Figure 10:
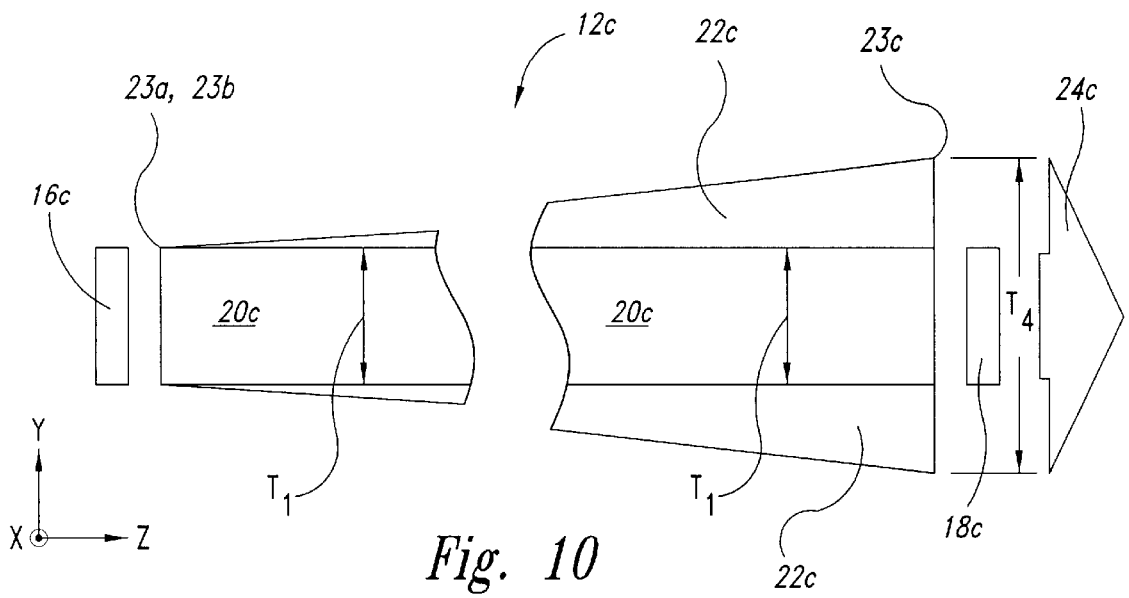
FIG. 10 is a fragmentary side elevational schematic drawing of a gain medium of a third embodiment of the laser of the present invention generally depicted in FIG. 1A.
Figure 11:
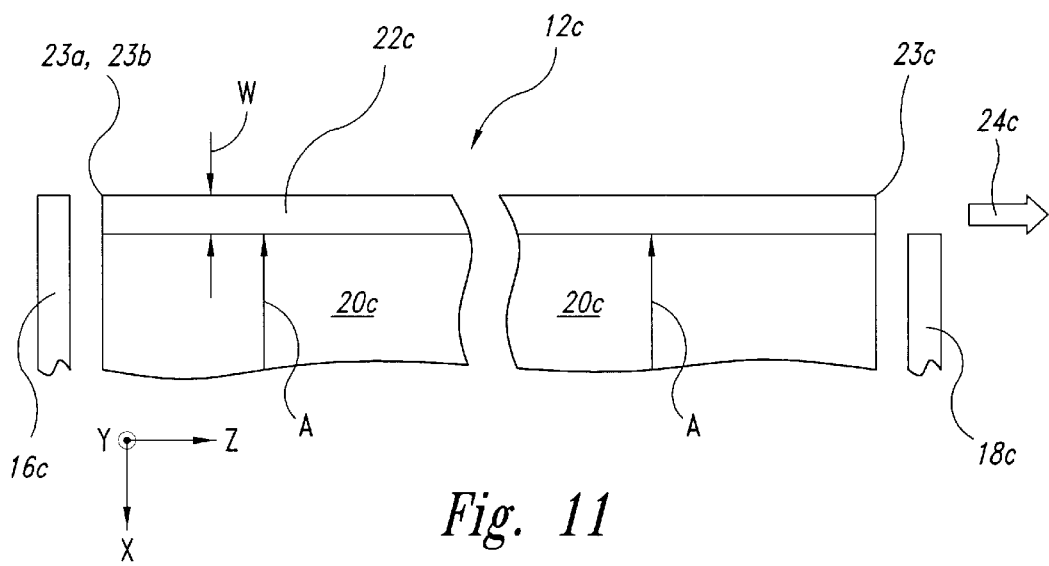
FIG. 11 is a fragmentary top plan schematic drawing of the gain medium of FIG. 10 with mirrors shown.

In other embodiments, the one or more OBTPT longitudinal strips have varying z-axis lengths. For instance, a third depicted embodiment has a gain medium 12c with a main portion 20c with an y-axis thickness T1 and a OBTPT longitudinal strip 22c with varying y-axis thickness as shown in FIGS. 10 and 11. The third depicted embodiment with the gain medium 12c is similar to the first depicted embodiment of FIG. 2 with the gain medium 12a except that locations 23a and 23b of the third depicted embodiment with the gain medium 12c share the same location along the z-axis. Consequently, the OBTPT longitudinal strip 22c is of the same z-axis length as the main portion 20c of the gain medium 12c.

Figure 12:
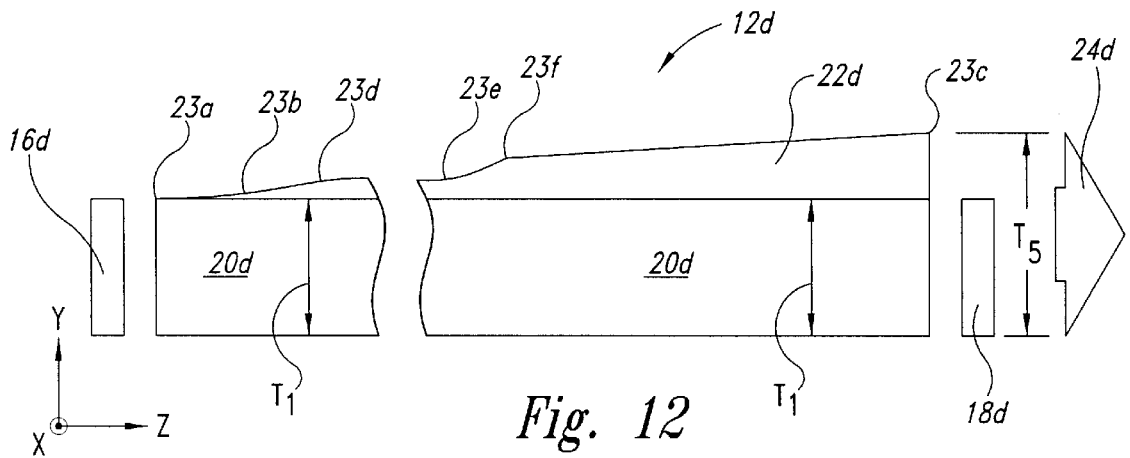
FIG. 12 is a fragmentary side schematic drawing of a gain medium of a fourth embodiment of the laser of the present invention generally depicted in FIG. 1A.
Figure 13:
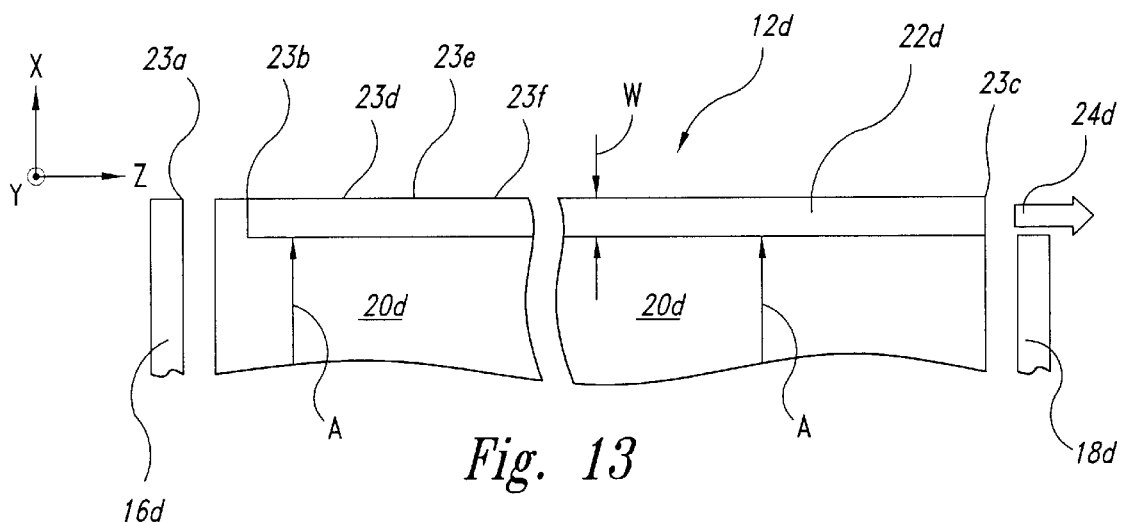
FIG. 13 is a fragmentary top plan schematic drawing of the gain medium of FIG. 12 with mirrors shown.

Other embodiments have one or more OBTPT longitudinal strips with y-axis thicknesses varying either non-linearly and/or non-continuously. For instance, a fourth embodiment has a gain medium 12d with a main portion 20d and a OBTPT longitudinal strip 22d as shown in FIGS. 12 and 13 similar to the first embodiment of the gain medium 12a of FIG. 2 except that the OBTPT longitudinal strip 22d does not vary continuously. Instead, the OBTPT strip 22d only increases in y-axis thickness in a linearly fashion between z-axis locations 23b to 23d and in a non-linearly fashion between z-axis locations 23e to 23f. The OBTPT strip 22d remains a constant y-axis thickness between z-axis locations 23d to 23e and z-axis locations 23f to 23c.

Figure 14:
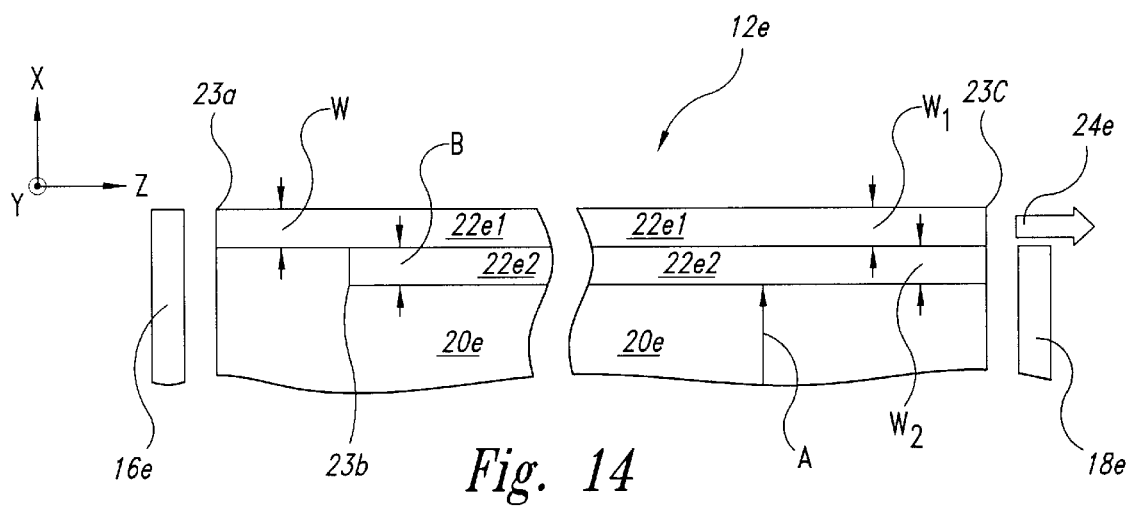
FIG. 14 is a fragmentary top plan schematic drawing of a gain medium of a fifth embodiment of the laser of the present invention generally depicted in FIG. 1A with mirrors shown.

Other embodiments can have more than one OBTPT longitudinal strip. For instance, a fifth embodiment has a gain medium 12e with a main portion 20e having an x-axis width of A, a first OBTPT longitudinal strip 22e1 having an x-axis width of W1, and a second OBTPT longitudinal strip 22e2 having an x-axis width of W2, as shown in FIG. 14. In some versions of the fifth embodiment, the x-axis widths W1 and W2 of the first and second OBTPT longitudinal strips 22e1 and 22e2 are the same. In some of these versions of the fifth embodiment the first and second OBTPT longitudinal strips 22e1 and 22e2 act like one continuous OBTPT longitudinal strip such that the y-axis thickness at location 23c of the second OBTPT longitudinal strip is the same as the y-axis thickness at location 23a of the first OBTPT longitudinal strip. In these versions of the fifth embodiment the widths W1 and W2 of the first and second OBTPT longitudinal strips 22e1 and 22e2 are the same and chosen similar to ways discussed for the x-axis width, W, of the longitudinal OBTPT 22a of the first embodiment. The x-axis width, A, of the main portion 20e is generally, but not necessarily, larger than the combined x-axis widths W1 and W2 of the first and second OBTPT longitudinal strips 22e1 and 22e2.

Figure 15:
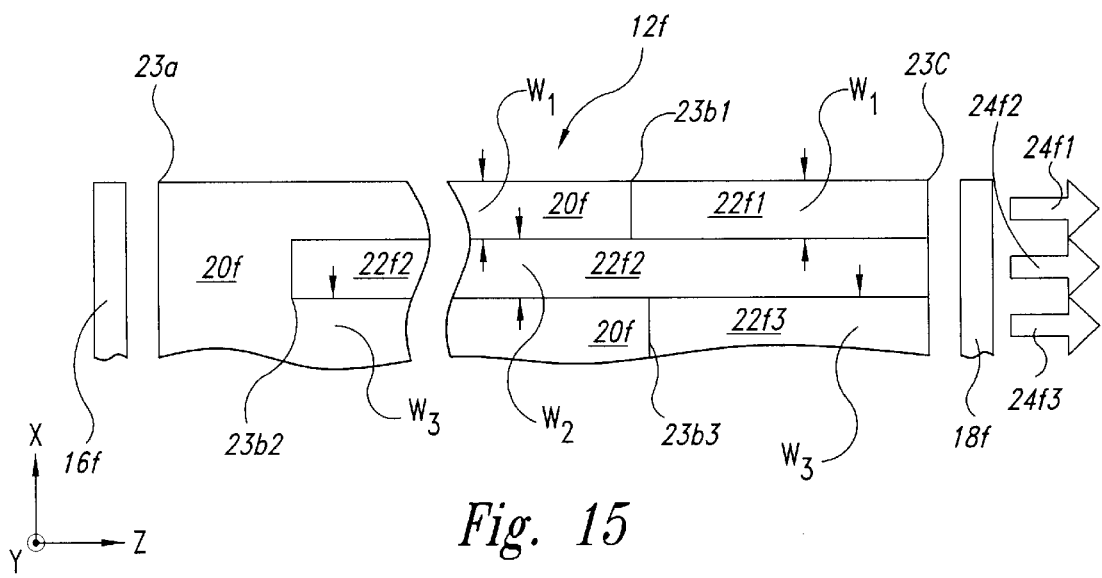
FIG. 15 is a fragmentary top plan schematic drawing of a gain medium of a sixth embodiment of the laser of the present invention generally depicted in FIG. 1A with mirrors shown.

Another example of more than one OBTPT longitudinal strips in a gain medium is shown in FIG. 15 and involves a sixth embodiment having a gain medium 12f with first and second reflector systems 16f and 18f, a main portion 20f, first, second, and third OBTPT longitudinal strips 22f1, 22f2, and 22f3, and first, second, and third output laser beams 24f1, 24f2, and 24f3. The first and second reflector systems 16f and 18f are configured to form a stable resonator in the x-axis and y-axis, which is not conducive to edge coupling of the output laser beams 24f1–24f3. To allow the output laser beams 24f1–24f3 to exit the gain medium 12f, the second reflector system 18f is partially reflecting and partially transparent to the output laser beams 24f1–24f3.

The first, second, and third OBTPT longitudinal strips 22f1, 22f2, and 22f3 have x-axis widths W1, W2, and W3, which can be different or the same. As shown in FIG. 15, the first, second, and third OBTPT longitudinal strips 22f1, 22f2, and 22f3 start at z-axis locations 23b1, 23b2, and 23b3, respectively, which in this sixth embodiment are at different locations along the z-axis, but can be also at the same location along the z-axis in other embodiments. The y-axis thicknesses of the first, second, and third OBTPT longitudinal strips 22f1–22f3 also can vary in the same manner or differently along the z-axis. The number of OBTPT longitudinal strips in other embodiments can also be more or less than the number of this sixth embodiment of the gain medium 12f. All these factors mentioned allows for tailoring of a collective output laser beam resultant from the individual first, second, and third output laser beams 24f1, 24f2, and 24f3, or more output laser beams of other embodiments having an x-axis width up to the total x-axis width of the gain medium 12f.

Figure 16:
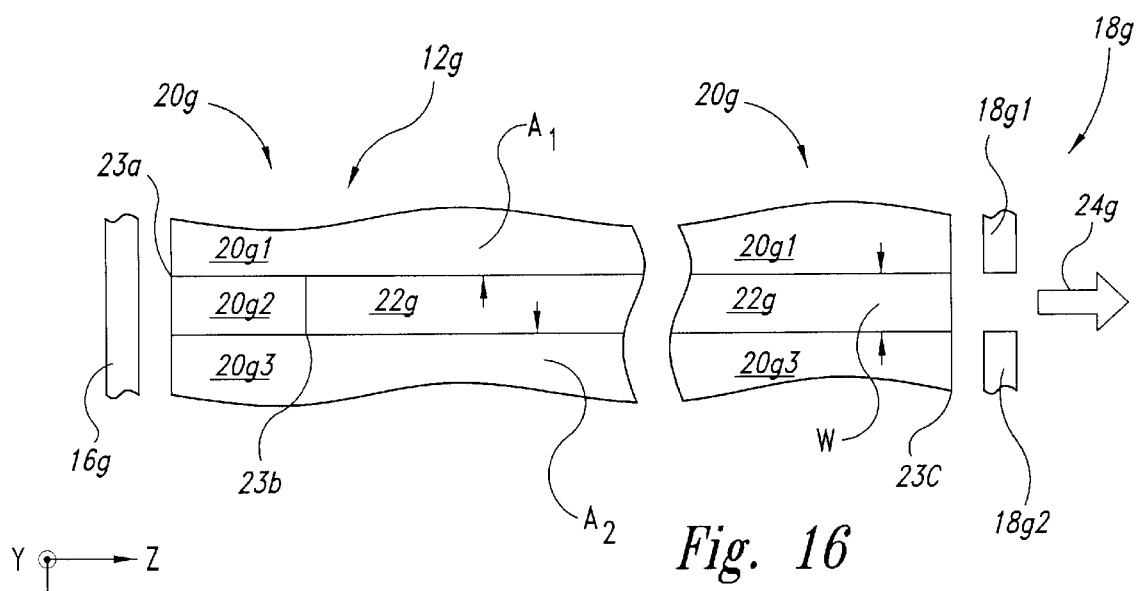
FIG. 16 is a fragmentary top plan view schematic drawing of a gain medium of a seventh embodiment of the laser of the present invention generally depicted in FIG. 1A with mirrors shown.

A seventh embodiment has a gain medium 12g with a main portion 20g having first, second, and third main sub-portions 20g1, 20g2, 20g3, respectively, and an OBTPT longitudinal strip 22g in a mid-portion, with respect to the x-axis, of the gain medium 12g, as shown in FIG. 16. This seventh embodiment illustrates how a gain medium can avoid having a OBTPT longitudinal strip along an x-axis edge of the gain medium but instead be substantially centered in the gain medium with respect to the x-axis or otherwise located depending upon the x-axis width, A1 and A2, of the first and third main sub-portions 20g1, and 20g3, respectively. The x-axis width of the OBTPT longitudinal strip 22g is generally determined using ways described above for the OBTPT longitudinal strip 22a of the first embodiment. The gain medium 12g also has a first reflector system 16g and a second reflector system 18g with first and second reflectors 18g1 and 18g2 that allow an output laser beam 24g through a mid-portion of the second reflector system.

Figure 17:
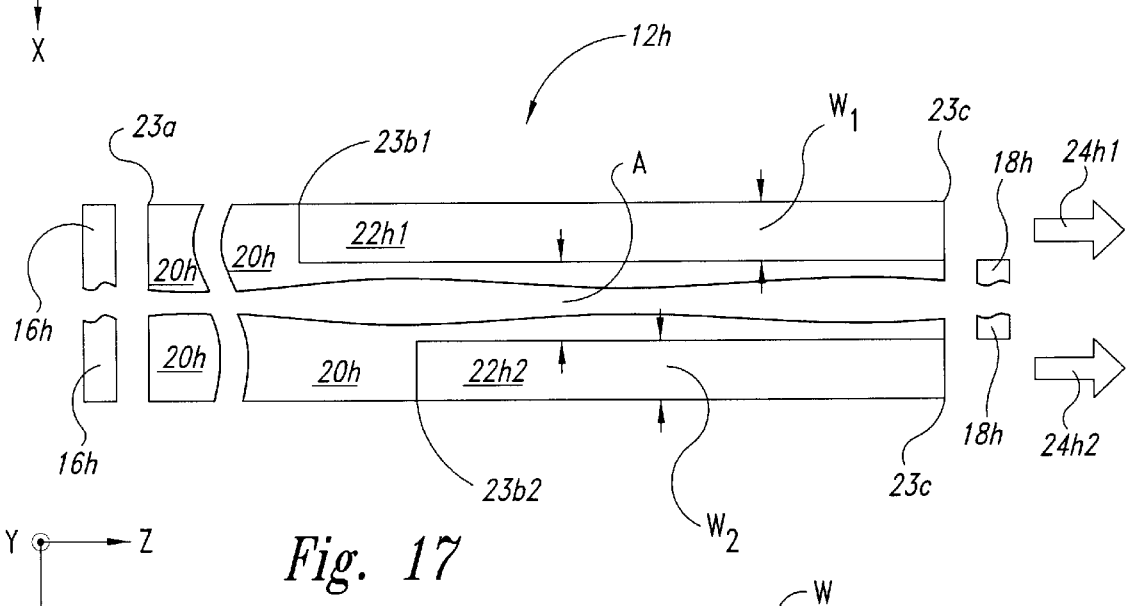
FIG. 17 is a fragmentary top plan schematic drawing of a gain medium of a eighth embodiment of the laser of the present invention generally depicted in FIG. 1A with mirrors shown.

An eighth embodiment has a gain medium 12h with a main portion 20h, a first OBTPT longitudinal strip 22h1, and a second OBTPT longitudinal strip 22h2, as shown in FIG. 17. This eighth embodiment illustrates how a gain medium can have two independent OBTPT longitudinal strips along both z-axis edges of the gain medium. The x-axis widths W1 and W2 of the first and second OBTPT longitudinal strips 22h1 and 22h2 can be the same or different from one another and are generally determined using ways described for the OBTPT longitudinal strip 22a of the first embodiment.

Figure 18A:
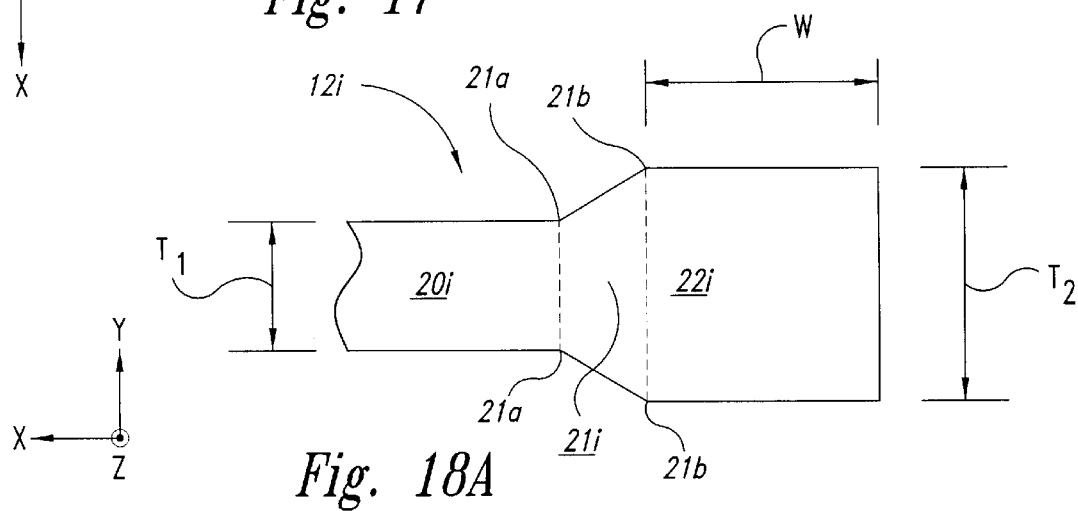
FIG. 18A is a fragmentary end schematic drawing (taken substantially along lines 18A—18A of FIG. 18B) of a gain medium of a ninth embodiment of the laser of the present invention generally depicted in FIG. 1A.
Figure 18B:
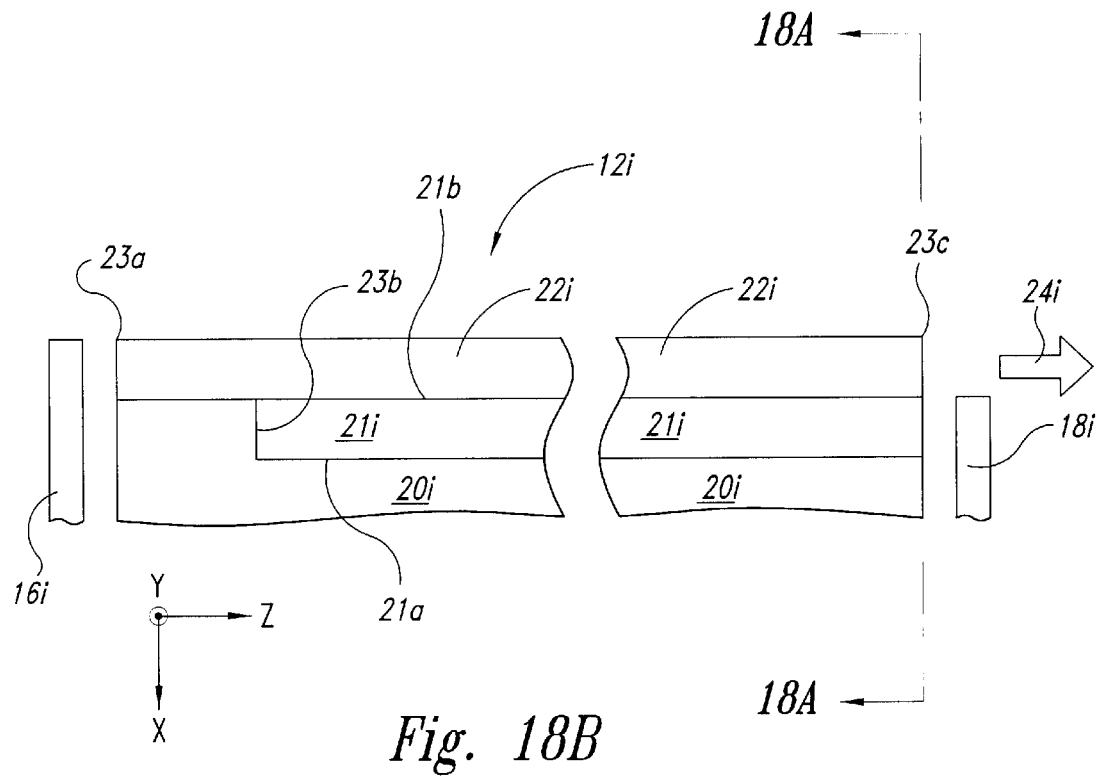
FIG. 18B is a fragmentary top plan view of the gain medium of FIG. 18A with mirrors shown.
Figure 18C:
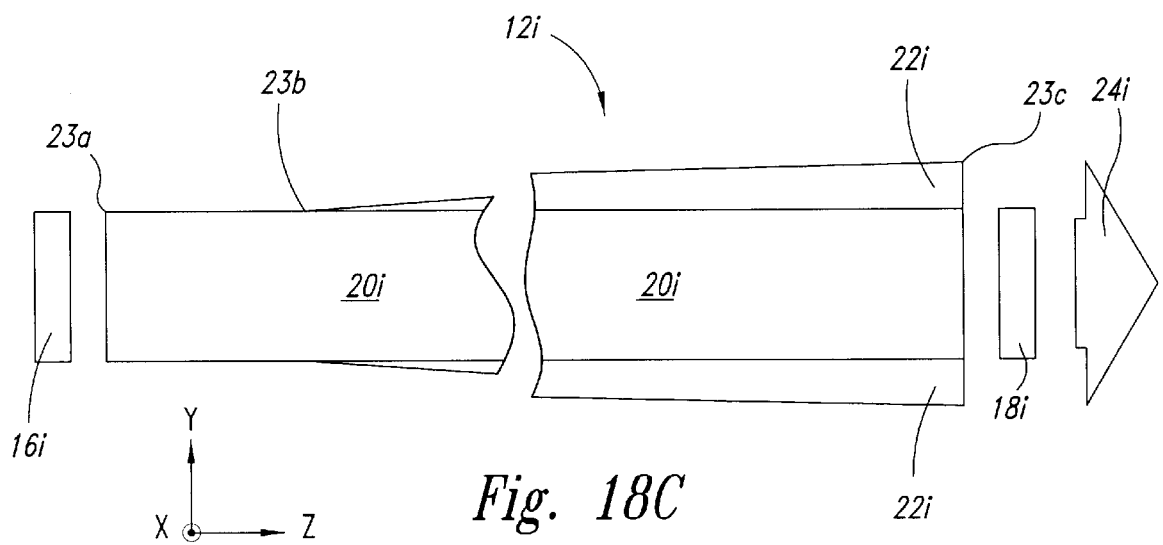
FIG. 18C is a fragmentary side elevational view of the gain medium of FIG. 18A with mirrors shown.

A ninth embodiment has a gain medium 12i with a main portion 20i, a transition portion 21i, and an OBTPT longitudinal strip 22i, as shown in FIGS. 18A–18C. Both the transition portion 21i and the OBTPT longitudinal strip 22i start at a z-axis location 23b and run along the z-axis ending at a z-axis location 23c. Relative to the x-axis, the transition portion 21i is located between the main portion 20i and the OBTPT longitudinal strip 22i. At x-axis location 21a, the transition portion 21i has the same y-axis thickness as the main portion 20i and at x-axis location 21b, the transition portion has the same y-axis thickness as the OBTPT longitudinal strip, all along the z-axis length of the transition portion and the OBTPT longitudinal strip. The transition portion 21i linearly and continuously varies in y-axis thickness along the x-axis as shown in FIG. 18A showing the gain medium 12i at the z-axis location 23c. Transition portions of other embodiments can vary non-linearly and/or non-continuously in y-axis thickness along the x-axis. A cross-section of a pair of first and second electrodes 26' and 28' at the z-axis location 23c corresponding to a case where the gain medium 12i is a gas is shown in FIGS. 19A and 19B.

Figure 20C:
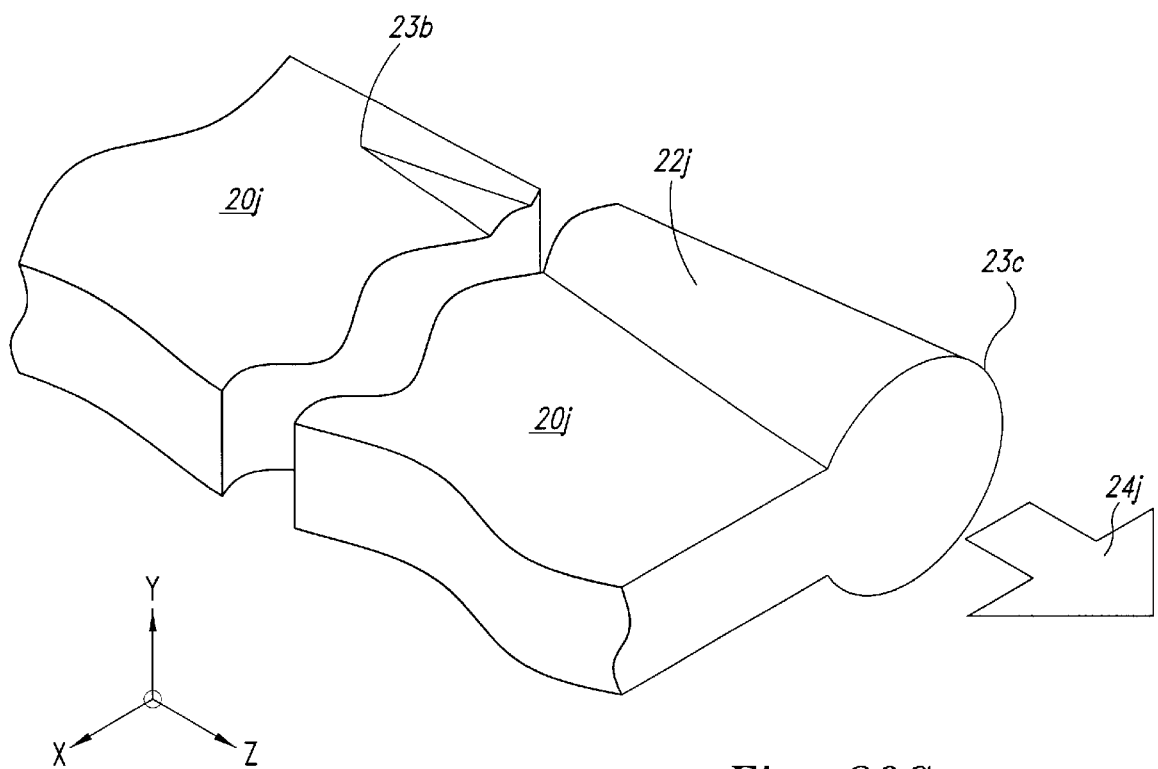
FIG. 20C is a fragmentary isometric schematic drawing of the gain medium of FIG. 20A.
Figure 21:
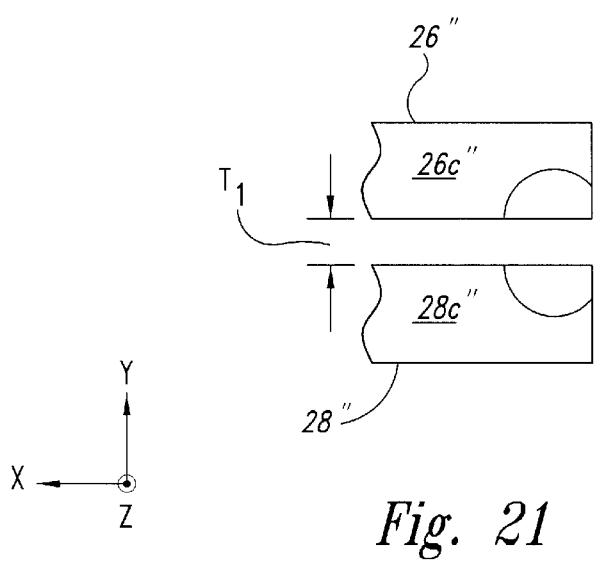
FIG. 21 is a fragmentary end view of an electrode pair associated with the gain medium of FIG. 20A.

Other embodiments have OBTPT longitudinal strips of other various shapes, some not having flat surfaces. A tenth embodiment has a gain medium 20j with a main portion 20j and an OBTPT longitudinal strip 22j as shown in FIGS. 20A, 20B, 20C, and 21. The OBTPT longitudinal strip 22j has circular cross-sectional profiles when viewed in x-y planes. For instance, a cross-section taken at a z-axis location 23c (shown in FIG. 20B) is shown in FIG. 20A. A cross-section of a pair of first and second electrodes 26" and 28" at the z-axis location 23c corresponding to a case where the gain medium 12j is a gas is shown in FIG. 21.

Other embodiments have gain media that have one or more sections per gain medium. To accommodate these multi-sectional gain media, one or more OBTPT longitudinal strips are located on one or more of the sections of each of the gain media. For instance, an eleventh embodiment has a gain medium 12k with first, second, and third gain medium sections 12k1, 12k2, and 12k3 with first, second, and third main portions 20k1, 20k2, and 20k3, respectively as shown in FIGS. 22 and 23. The third gain medium section 12k3 also has an OBTPT longitudinal strip 22k of a similar configuration as discussed with the first embodiment with the gain medium 12a shown in FIG. 2.

Figure 24:
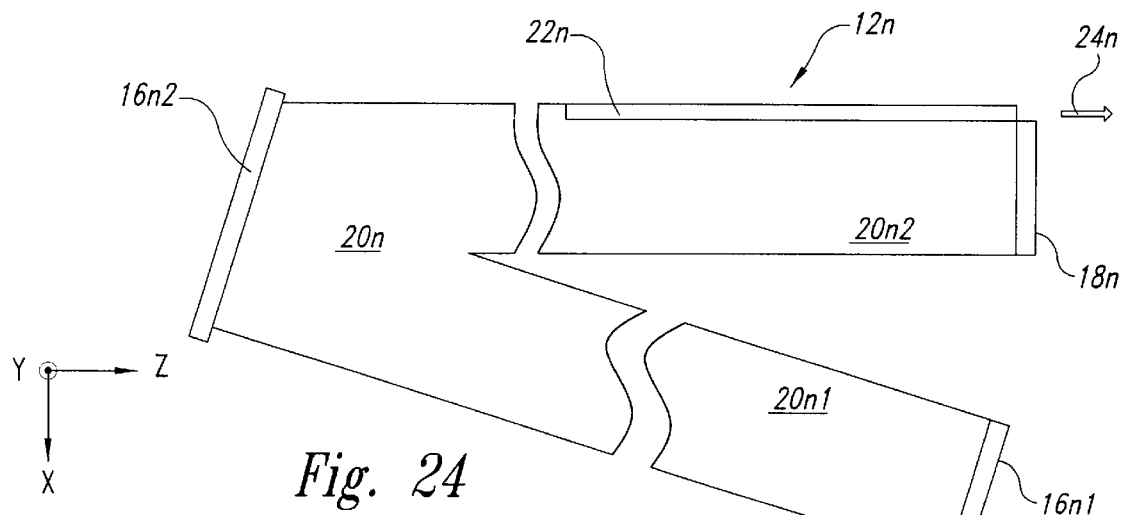
FIG. 24 is a fragmentary top plan schematic drawing of a gain medium of a twelfth embodiment of the laser of the present invention generally depicted in FIG. 1A shown with mirrors.
Figure 25:
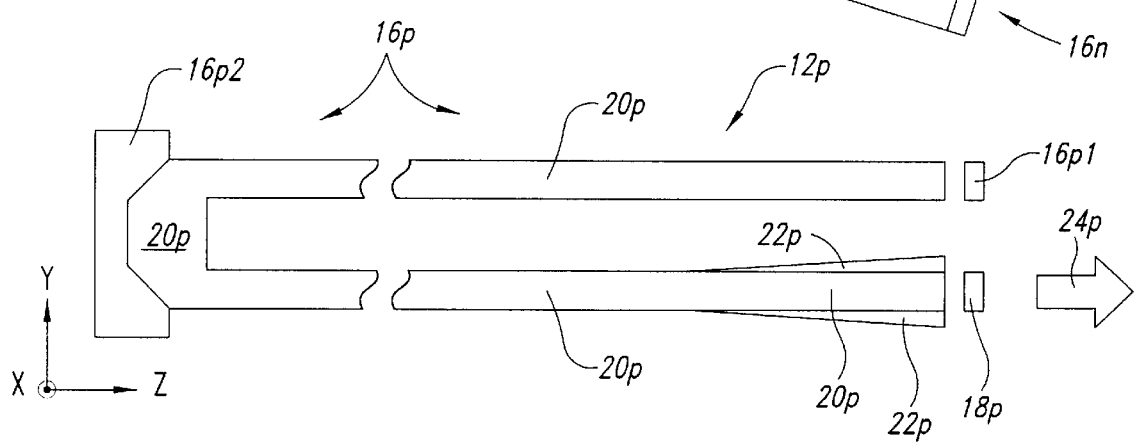
FIG. 25 is a fragmentary side elevational schematic drawing of a gain medium of a thirteenth embodiment of the laser of the present invention generally depicted in FIG. 1A shown with mirrors.

Other embodiments have reflector systems incorporated into their design that allow for a folded resonator. Two examples of folded resonator embodiments are shown in FIGS. 24 and 25 illustrating a twelfth embodiment having a gain medium 12n and a thirteenth embodiment having a gain medium 12p, respectively. The twelfth embodiment has the gain medium 12n with a main portion 20n comprising first and second legs 20n1 and 20n2 and an OBTPT longitudinal strip 22n located along the second leg 20n2 of the main portion 20n. The twelfth embodiment also has first and second reflector systems 16n and 18n configured for a folded resonator, the first reflector system 16n being comprised of a first rear mirror 16n1 and a second folding mirror 16n2.

The second leg portion 20n2 is adjacent to an edge coupling reflector system 18n where an output laser beam 24n exits the gain medium 12n. As such, the location of the OBTPT longitudinal strip 22n along the second leg 20n2 of the main portion 20n is similar to other embodiments described above. However, other embodiments of folded resonators can have one or more OBTPT longitudinal strips located in other legs of a gain medium in addition or besides the legs nearest the exit point of an output laser beam. Other embodiments can also have more than two legs in a folded resonator configuration. The thirteenth embodiment is similar to the twelfth embodiment, but illustrates different reflector systems forming a folded resonator since the thirteenth embodiment has first and second reflector systems 16p and 18p (the first reflector system 16p being comprised of a first rear mirror 16p1 and a second folding mirror 16p2) that are of different design than the first reflector system 16n of the twelfth embodiment.

Figure 26:
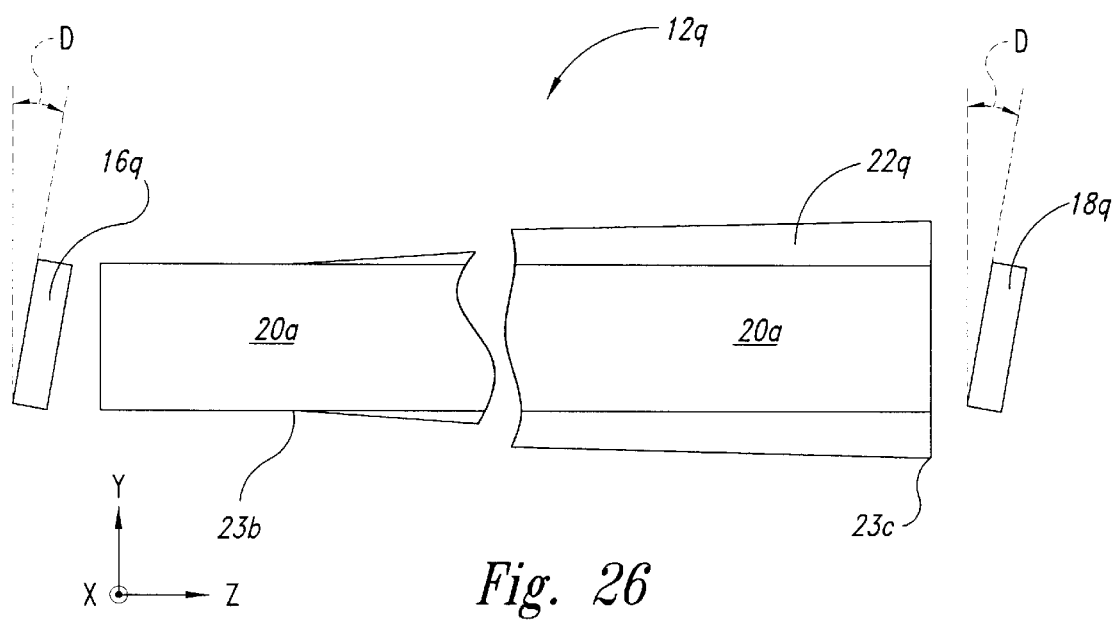
FIG. 26 is a fragmentary side elevational schematic drawing of a gain medium of a fourteenth embodiment of the laser of the present invention generally depicted in FIG. 1A shown with mirrors.
Figure 27:
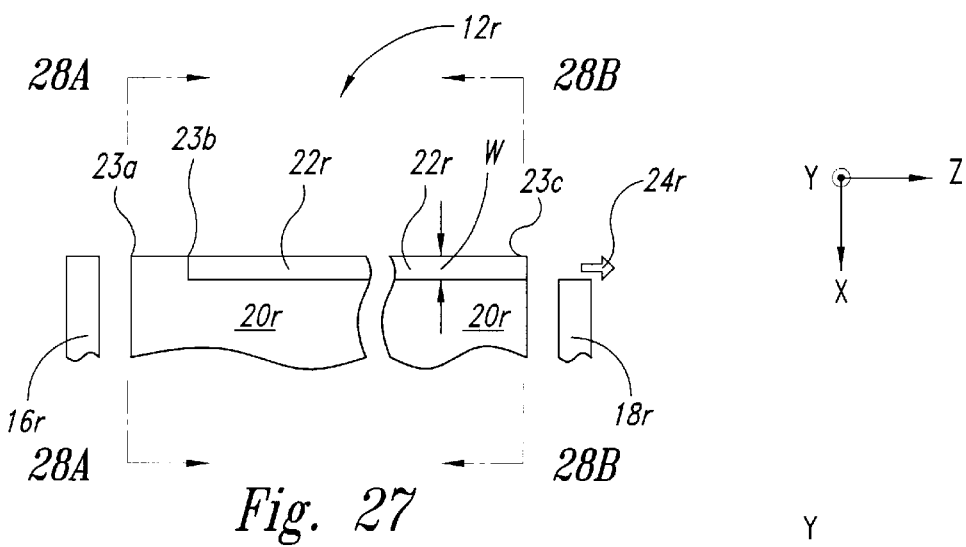
FIG. 27 is a fragmentary top plan schematic drawing of a gain medium of a fifteenth embodiment of the laser of the present invention generally depicted in FIG. 1A shown with mirrors.

A fourteenth embodiment shown in FIG. 26 has a gain medium 12q with a main portion 20q and an OBTPT longitudinal strip 22q of similar shape and location as the gain medium 12a of the first embodiment shown in FIG. 2. The fourteenth embodiment provides an example of first and second reflector systems 16q and 18q being tilted at an angle D from the y-axis. Other embodiments having other configurations of main portions and one or more OBTPT longitudinal strips can also have tilted reflector systems.

In the embodiments discussed above, the main portions of the gain media have surfaces that were in x-z planes of the main portion having a rectangular shape. A fifteenth embodiment illustrated in FIGS. 27, 28A, 28B, and 28C, and a sixteenth embodiment illustrated in FIGS. 29, 30A, and 30B provide examples of gain media having main portions that are of non-rectangular shape not having surfaces that are parallel to x-z planes.

Figure 28A:
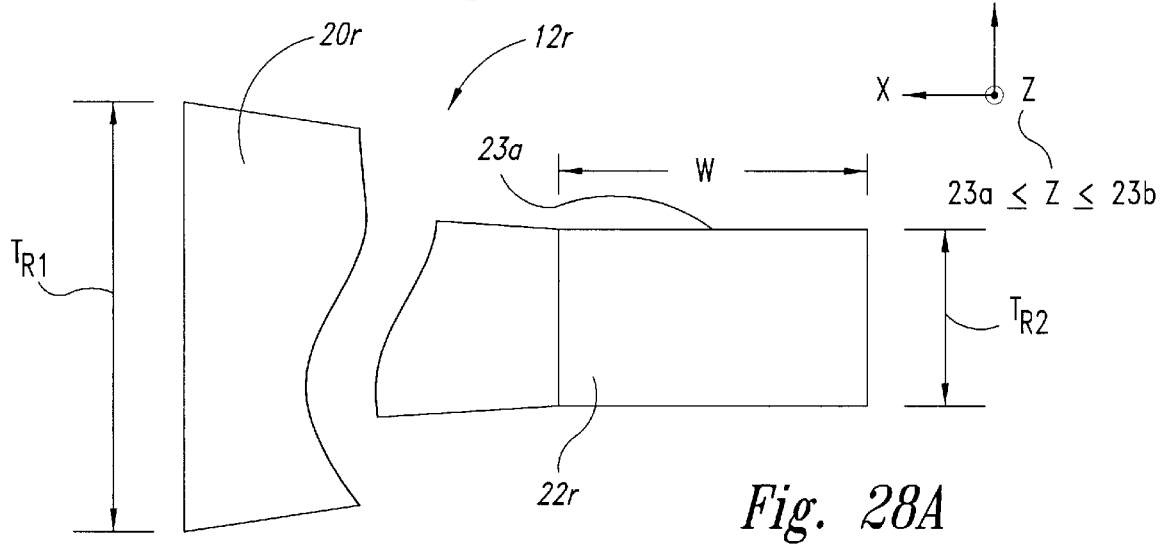
FIG. 28A is a fragmentary cross-sectional view of the gain medium taken substantially along lines 28A—28A of FIG. 27.
Figure 28B:
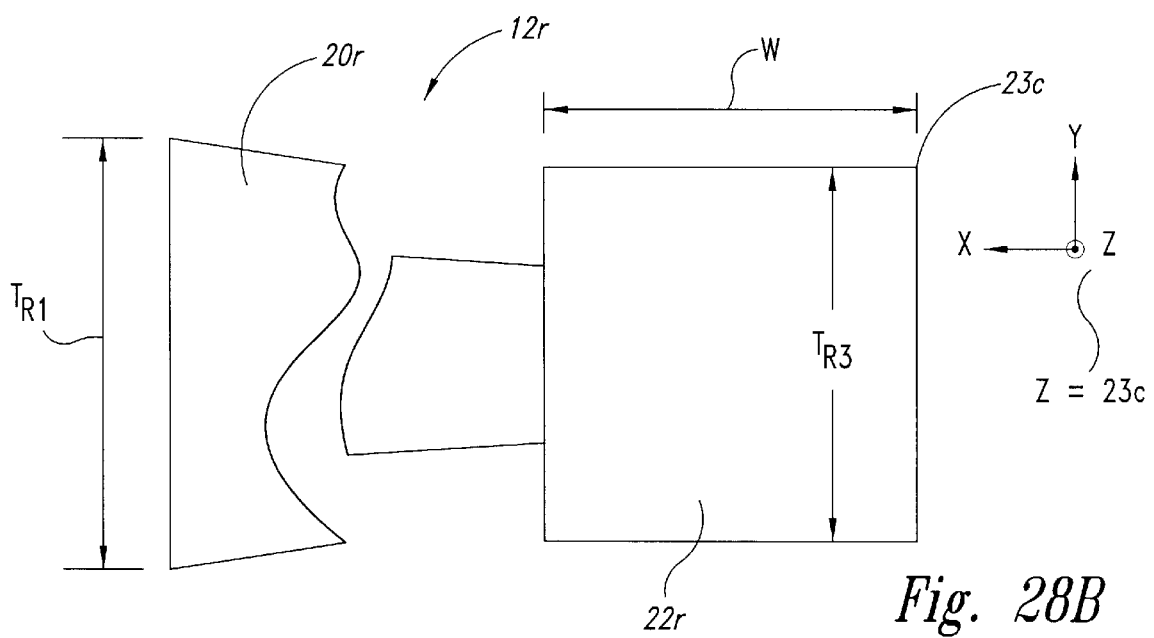
FIG. 28B is a fragmentary cross-sectional view of the gain medium taken substantially along lines 28B—28B of FIG. 27.
Figure 28C:
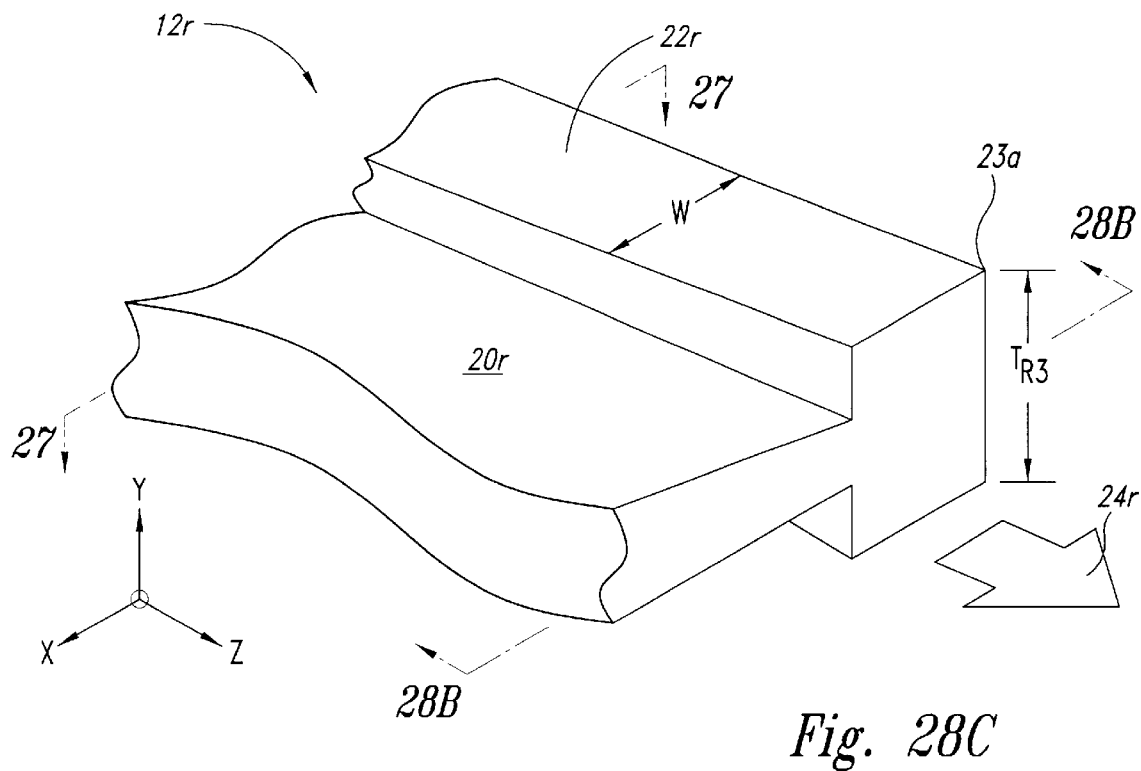
FIG. 28C is a fragmentary isometric schematic drawing of the gain medium of FIG. 27.

The fifteenth embodiment has a gain medium 12r having a main portion 20r and an OBTPT longitudinal strip 22r. FIG. 28A shows a cross-sectional view of the gain medium 12r taken in the x-y plane showing the shape between z-axis locations 23a and 23b. FIG. 28B shows a cross-sectional view of the gain medium 12r taken in the x-y plane at z-axis location 23c. The main portion 20r decreases in y-axis thickness at locations closer along the x-axis toward the OBTPT longitudinal strip 22r. The main portion 20r has a wedge shape in y-x cross-section, tapering toward the OBTPT longitudinal strip 22r. The OBTPT longitudinal strip 22r is of similar configuration and location as the longitudinal strip 22a of the gain medium 12a of the first embodiment of FIG. 2. Other embodiments have non-rectangular one or more main portions of gain media with different one or more OBTPT longitudinal strips.

Figure 29:
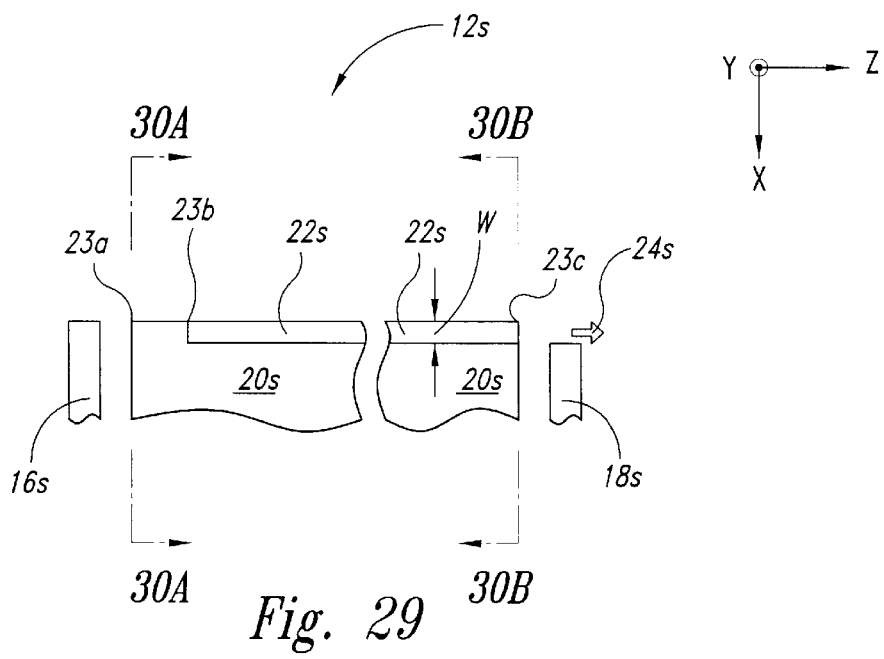
FIG. 29 is a fragmentary top plan schematic drawing of a gain medium of a sixteenth embodiment of the laser of the present invention generally depicted in FIG. 1A shown with mirrors.
Figure 30A:
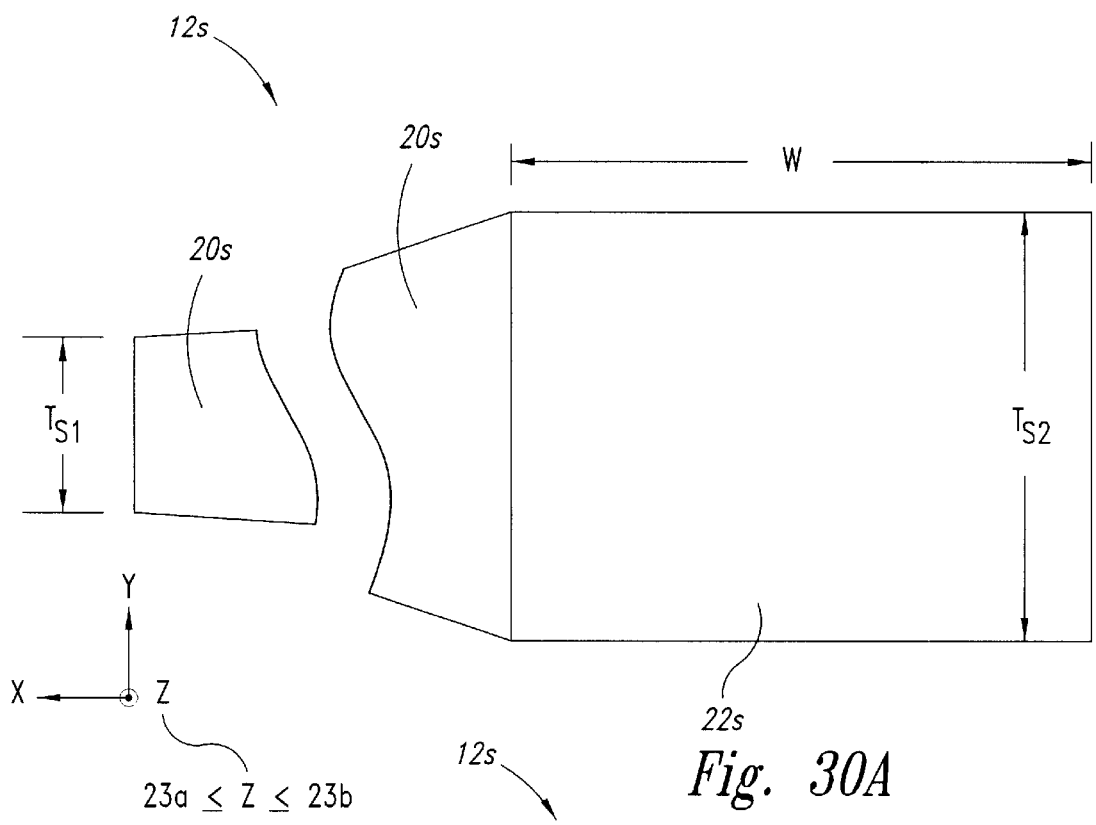
FIG. 30A is a fragmentary cross-sectional view of the gain medium taken substantially along lines 30A—30A of FIG. 29.
Figure 30B:
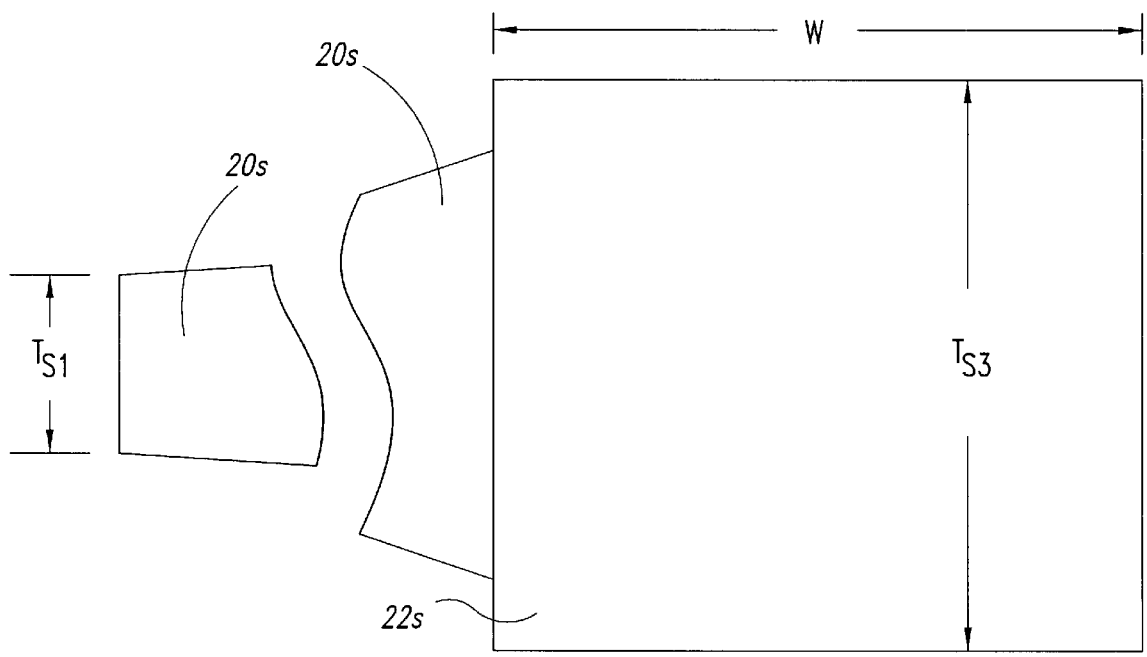
FIG. 30B is a fragmentary cross-sectional view of the gain medium taken substantially along lines 30B—30B of FIG. 29.

A sixteenth embodiment shown in FIGS. 29, 30A and 30B is similar to the fifteenth embodiment except that the sixteenth embodiment has a gain medium 12s that increases in y-axis thickness at locations closer along the x-axis to an OBTPT longitudinal strip 22s. The main portion 20s in this sixteenth embodiment has a wedge shape in y-x cross-section, but tapers away from the OBTPT longitudinal strip 22s.

Figure 31:
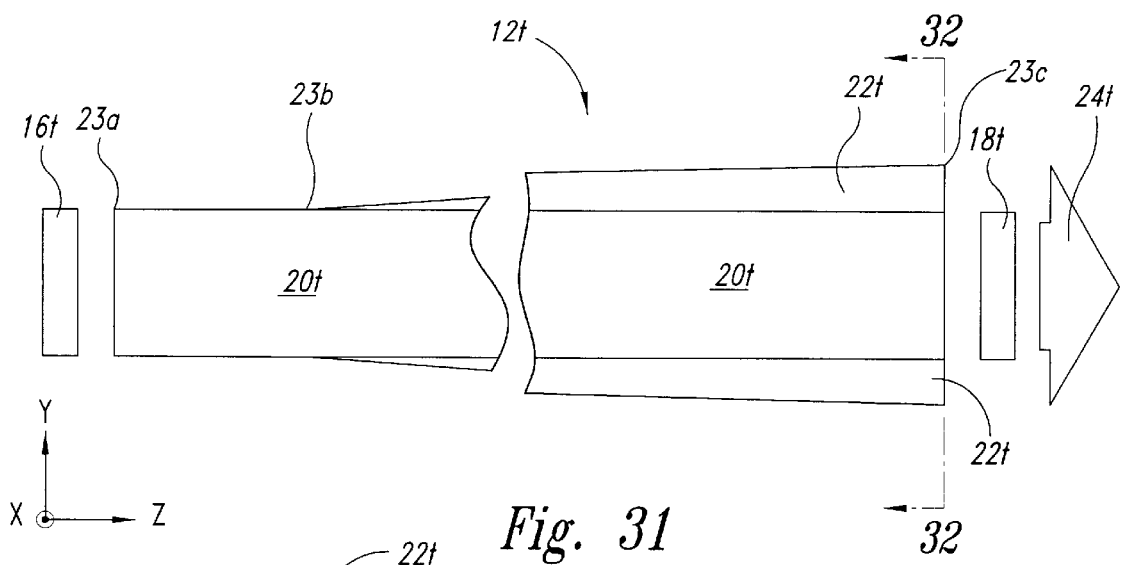
FIG. 31 is a fragmentary side elevational schematic drawing of a gain medium of a seventeenth embodiment of the laser of the present invention generally depicted in FIG. 1A.
Figure 32:
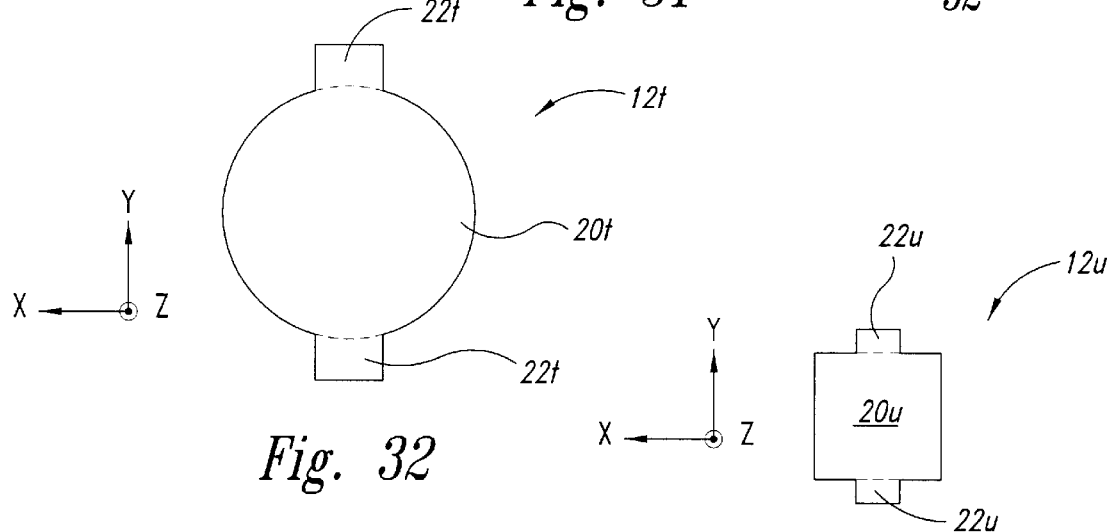
FIG. 32 is an end view of the gain medium of FIG. 31 taken substantially along lines 32—32 of FIG. 31.

Other embodiments have main portions of gain medium that have cross-sectional profiles in x-y planes that have other shapes. For instance, a seventeenth embodiment has a gain medium 12t with a main portion 20t and an OBTPT longitudinal strip 22t, as shown in FIGS. 31 and 32. The main portion 20t is different from others described in that it is cylindrical having doughnut shaped cross-sectional profiles in x-y planes. The OBTPT longitudinal strip 22t is similar to others described above as far as general location, configuration, and linearly change y-axis thickness. Other embodiments have one or more OBTPT longitudinal strips of other various shapes.

Figure 33:
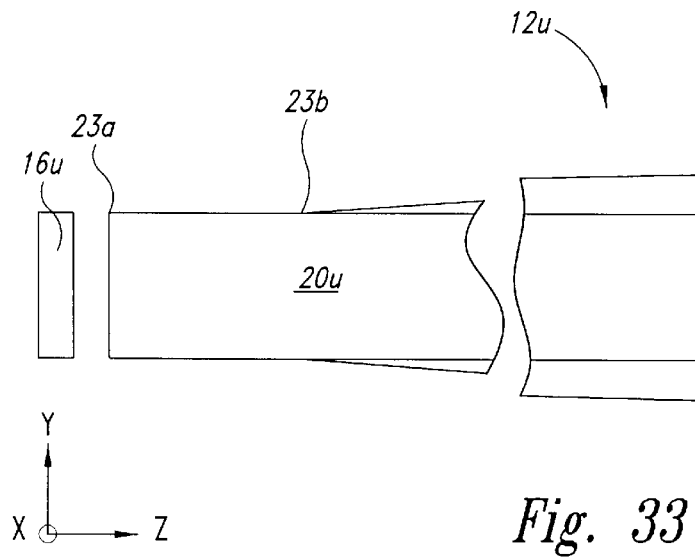
FIG. 33 is a fragmentary side elevational schematic drawing of a gain medium of an eighteenth embodiment of the laser of the present invention generally depicted in FIG. 1A.
Figure 34:
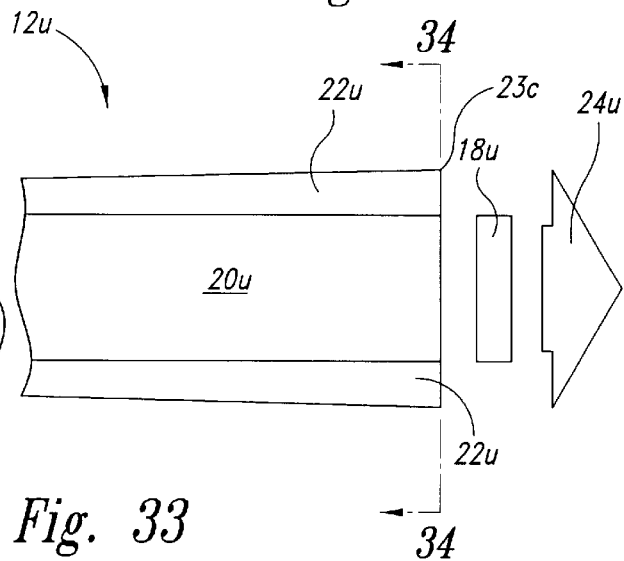
FIG. 34 is an end view of the gain medium of FIG. 33 taken substantially along the lines 34—34 of FIG. 33.

An eighteenth embodiment shown in FIGS. 33 and 34 has a gain medium 12u with a main portion 20u having a square cross-sectional profile in x-y planes and an OBTPT longitudinal strip 22u similar to the longitudinal strip 22a of the first embodiment shown in FIG. 2.

Other embodiments have gain medium containing more than one OBTPT longitudinal strips that increase in y-axis thickness along opposite z-axis directions. For instance, in a nineteenth embodiment shown in FIGS. 35 and 36 a gain medium 12v has a main portion 20v, a first OBTPT longitudinal strip 22v1, and a second OBTPT longitudinal strip 22v2. The nineteenth embodiment also has first and second reflector systems 16v and 18v. The first OBTPT longitudinal strip 22v1 is configured to receive incoming laser light 24v1 at location 23a and so has an x-axis width that accommodates the incoming laser light generally determined using ways described for the OBTPT longitudinal strip 22a of the first embodiment. The first OBTPT longitudinal strip 22v1 decreases in y-axis thickness between z-axis locations 23a and 23b1.

The first OBTPT longitudinal strip 22v1 has the same y-axis thickness as the main portion 20v at the z-axis location 23b1 to prepare light to leave the first OBTPT longitudinal strip and enter the main portion. After traveling through the main portion 20v, the light enters the second OBTPT longitudinal strip 22v2 at z-axis location 23b2 where the light is expanded out by following the increasing y-axis thickness of the second OBTPT longitudinal strip between the z-axis locations 23b2 and 23c. The x-axis width of the second OBTPT longitudinal strip 22v2 is determined using ways described for the OBTPT longitudinal strip 22a of the first embodiment. The first and second OBTPT longitudinal strips 22v1 and 22v2 of the nineteenth embodiment act as an amplifier for the laser light entering the first OBTPT longitudinal strip and exiting the second longitudinal strip.

Figure 37:
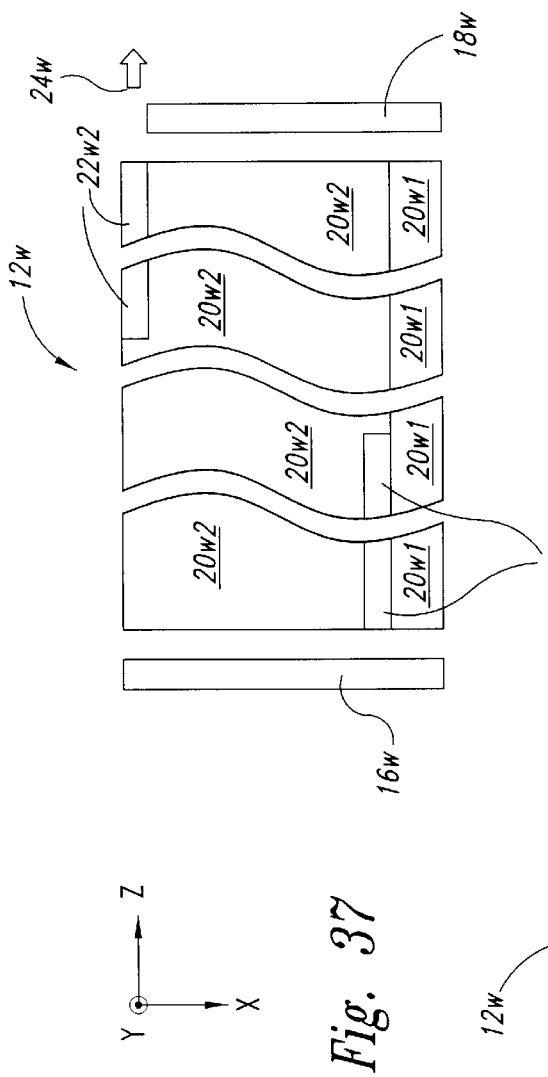
FIG. 37 is a fragmentary top plan schematic drawing of a gain medium of a twentieth embodiment of the laser of the present invention generally depicted in FIG. 1A shown with mirrors.
Figure 38:
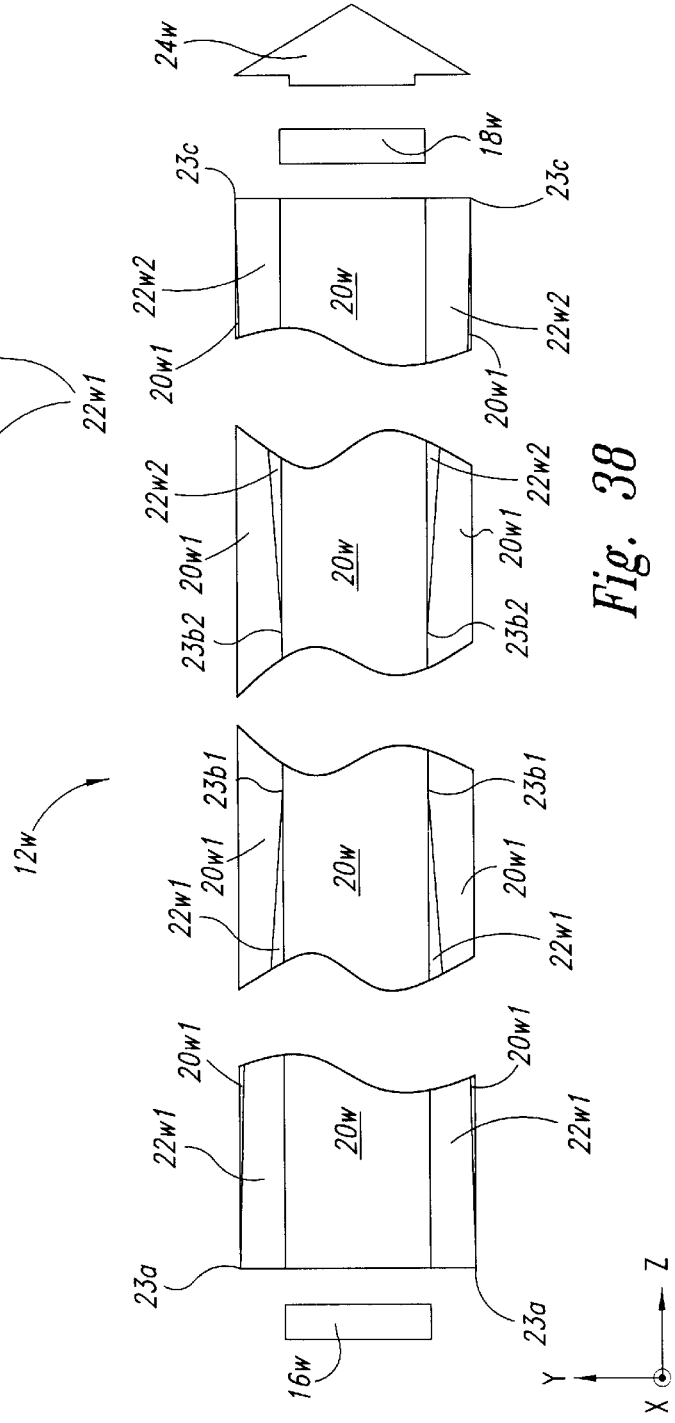
FIG. 38 is a fragmentary side elevational view of the gain medium of FIG. 37 shown with mirrors.
Figure 39E:
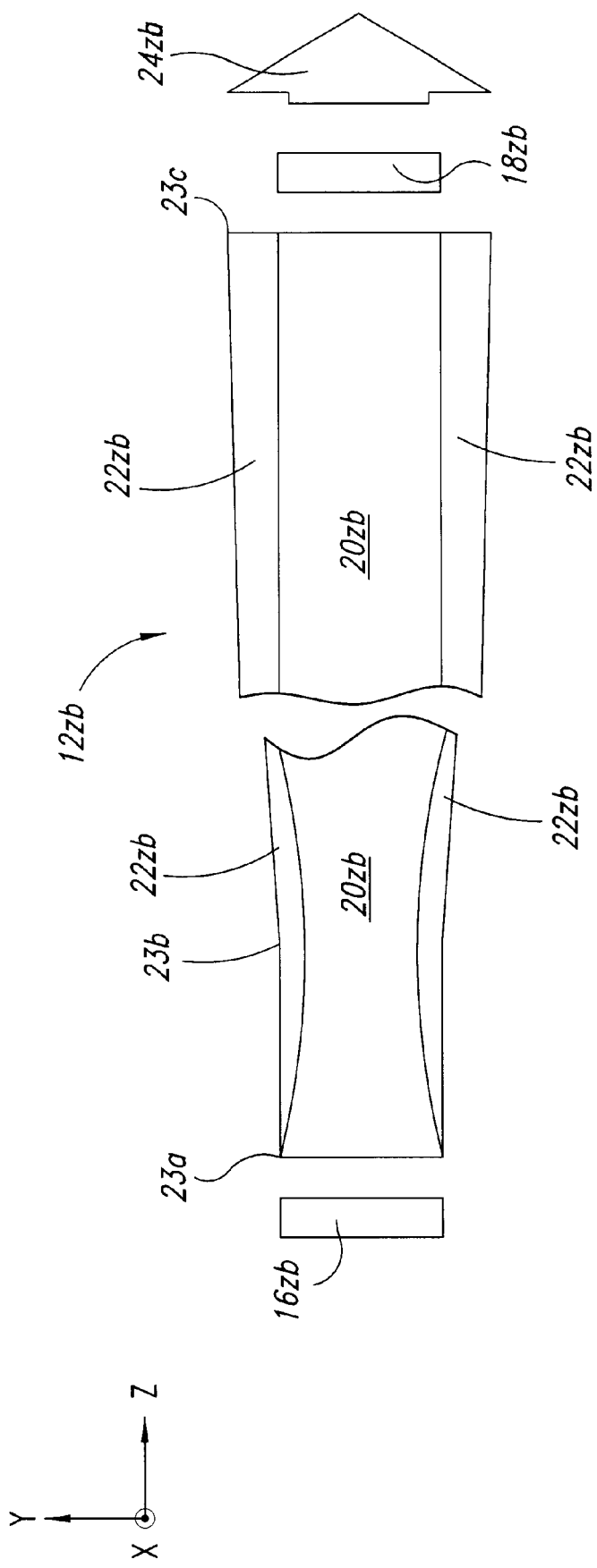

A twentieth embodiment has a gain medium 12w having first and second main portions 20w1 and 20w2 and first and second OBTPT longitudinal strips 22w1 and 22w2, as shown in FIGS. 37 and 38. The first main portion 20w1 has a y-axis thickness corresponding to free space propagation and the second main portion 20w2 has a y-axis thickness corresponding to waveguide propagation. The twentieth embodiment acts in a similar way as the nineteenth embodiment by collecting the light from the free space region first main portion 20w1 into the first OBTPT longitudinal strip 22w1 to travel through the waveguide region second main portion 20w2 and to exit from the gain medium 12w through the second OBTPT longitudinal strip 22w2.

Twenty-first through twenty-fifth embodiments each have a gain medium 12x, 12y, 12z, 12za, and 12zb, respectively, each have a main portion 20x, 20y, 20z, 20za, and 20zb and each have an OBTPT longitudinal strip 22x, 22y, 22z, 22za, and 22zb as shown in FIGS. 39A–E. The OBTPT longitudinal strips 22x, 22y 22z, 22za, and 22zb are generally similar to others discussed above and other versions of the twenty-first through twenty-fifth embodiments can have more than one longitudinal strip similar to those embodiments discussed above. What is different about the twenty-first though twenty-fifth embodiments is that for each embodiment, the y-axis thickness of the main portion 20x, 20y, 20z, 20za, and 20zb varies with respect to the z-axis. In particular, the main portion 20x has a generally bowed contour in y-axis thickness along the z-axis. Some versions of this embodiment have slight bows and others have more pronounced bows. For instance, one version has the main portion 20x vary from 2.0 mm to 1.5 mm in y-axis thickness. The bows can be true curves or linear approximations.

The main portion 20y is bowed, notched and tapered in y-axis thickness along the z-axis. The main portion 20y has its taper decreasing towards front resonator mirror 18y whereas other versions and embodiments have tapers increasing towards a front resonator mirror. The main portion 20z generally has a taper decreasing toward front resonator mirror 18z, but other versions and embodiments have tapers increasing towards a front resonator mirror. The main portion 20za has a series of sections with decreasing and increasing tapers. Other versions and embodiments can have more or less sections with decreasing and/or increasing tapers. The main portion 20zb has a bow in a portion near a rear mirror 16zb and is substantially constant y-axis thickness in other portions toward a front mirror 18zb.

Regarding dimensional considerations of the OBTPT longitudinal strips, the x-axis width is generally chosen to determine the x-axis width of the expected output beam in free space. The longitudinal taper of the OBTPT longitudinal strip is chosen such that optical radiation is guided in the narrow gap dimension such that the output laser beam expands in size to be equivalent to that of the corresponding perpendicular dimension. In other words, part of the gain medium surface is contoured with respect to the one or more OBTPT longitudinal strips such that a symmetrical beam or beam of other desired shape in both transverse dimensions is obtained as the output.

This taper may simply be a flat region of the appropriate longitudinal taper, or it may be profiled to match the shape of the beam. It is well known from the prior art how the beam from a waveguide optical resonator propagates, and in particular, how it diverges in free space after exiting the waveguide resonator cavity. See, for example, N. Hodgson and H. Weber, Optical Resonators: fundamentals, advanced concepts and applications, Springer-Verlag, London, 1997, chapter 2, p. 54–114. Therefore, it is straightforward to deduce how the mode expands in size as it propagates within the resonator cavity. The longitudinal taper of the one or more OBTPT longitudinal strips of the gain medium is then chosen such that it still guides, or restricts, the mode as the laser beam propagates to output from the gain medium. Knowing this, the other inter-related laser and resonator parameters are chosen in conjunction with the angle and width of the taper of the one or more OBTPT longitudinal strips to give a symmetrical or other desired shape output beam, or divergence, in both transverse x-axis and y-axis dimensions of the gain medium.

In x-y plane cross section, the cross-sectional shape of the one or more OBTPT longitudinal strips at locations along the longitudinal taper may be chosen to be one of any number of shapes. The simplest of which is just a flat rectangular region. However, there may be advantages to having this region contoured to perform some form of beam shaping prior to the optical radiation exiting the gain medium. For example, a round or elliptical shape may fit the mode of the laser beam within the gain medium better and induce the output beam to be of that shape for some specific end use or application. Furthermore, in order to implement this invention, part of or the entire taper of the OBTPT longitudinal strips for a gaseous gain medium may be placed in either or both electrode surfaces of first and second electrodes, whichever is most convenient.

Additionally, the transition step from a surface of a main portion of the gain medium to the longitudinal taper of an OBTPT longitudinal strip may be one of several forms as discussed above. For example, it may be an abrupt edge, it may have a chamfered edge or it may be slightly angled between the two sections. This feature may play an important role in any possible parasitic diffraction effects observed by virtue of implementing this type of gain medium structure.

A further benefit related to aspects of this invention is that it is possible to obtain a symmetrical output beam from a waveguide slab laser using spherical resonator optics. Conventional lasers, which implemented such spherical resonator optics, also required the addition of some external beam shaping optics to reformat the output beam into a symmetrical shape. The possible elimination of external reformatting and aspherical optics has the potential for significant cost savings. Alternatively, other non-spherical optical systems may also be used with this invention, such as cylindrical, toric, aspherical, or any combinations thereof.

This invention may be applied to a folded slab waveguide device as generally described with the folded resonator embodiments above. This would allow for the possibility of extracting the output beam from the centerline of the device rather than near the edge, as in a more traditional hybrid resonator slab device. Folding also offers many other well known advantages such as increasing the effective length of the resonator, which in turn increases the power stability of the device. It may also be implemented to increase the width of the discharge region whilst simultaneously reducing or minimizing spherical aberrations of the resonator optics. Finally, if a confocal negative branch unstable resonator is used in the free space axis of the cavity, such as the x-axis, the alignment stability may also be enhanced.

Many other embodiments and implementations can be envisioned. For example, in a device with multiple gain regions, such as described above, such as a folded design, the taper may be required to be placed in only one section of the device, closest to the output aperture, for example. Similarly, the taper need not extend the entire longitudinal length of the electrode, also in embodiments above, but only a length sufficient to provide for adequate beam expansion to be symmetrical in both transverse dimensions or at least to produce the desired beam shape. For example, with the appropriate design, the taper may need only extend for half of the longitudinal electrode length.

As stated, other embodiments have gain media that are of a non-gaseous type by implementing the longitudinal taper to a slab shaped solid state laser crystal. In some embodiments the crystal comprises ruby, YAG, Ti-sapphire, or some other combination of host material such as glass, oxides, sapphire, garnets, aluminate, oxysulfide, phosphates, silicates, tungstates, molybdates, vanadates, beryllates, fluorides and ceramics, and active ion such as neodymium, erbium, holmium, thulium, praseodymium, gadolinium, europium, ytterbium, cerium, samarium, dysprosium, terbium, promethium, lutetium, uranium, chromium, titanium, nickel, and cobalt. In general, embodiments include any large area, or extended area electrode/gain medium device, be it planar or annular, gas or solid.

From the foregoing it will be appreciated that, although specific embodiments of the invention have been described herein for the purposes of illustration, various modifications may be made without deviating from the spirit and scope of the invention. Accordingly, the invention is not limited except as by the appended claims.

It is claimed:

1. A laser for producing an output laser beam propagating substantially parallel to a z-axis being parallel to an optical axis, the output laser beam propagating in a space external to the laser, the laser comprising:

front and rear resonator mirrors bounding a resonator cavity, the front and rear resonator mirrors being aligned with respect to the optical axis; and a gain medium disposed between and extending toward the front and rear resonator mirrors, the gain medium having a first portion and a second portion, the first and second portions being joined to allow an internal laser beam formed within the gain medium to pass from the first portion to the second portion at a first location, the first portion being shaped to form the internal laser beam to have a first cross-sectional profile in a plane transverse to direction of propagation of the internal laser beam at the first location, the second portion being shaped to form the internal laser beam to have a second cross-sectional profile in a plane transverse to direction of propagation of the internal laser beam at a second location, the second location being where the internal laser beam exits the gain medium, the output laser beam having a cross-sectional profile in a plane transverse to direction of propagation of the output laser beam substantially equal to the second cross-sectional profile of the internal laser beam, the first and second cross-sectional profiles being different.

2. The laser of claim 1 wherein the gain medium is solid state.

3. The laser of claim 2 wherein the solid state gain medium includes at least one of the following materials: ruby, sapphire, glass, garnets, aluminate, oxysulfide, phosphates, silicates, tungstates, molybdates, vanadates, beryllates, fluorides, and ceramics.

4. The laser of claim 1 wherein the second cross-sectional profile is substantially symmetrical and the first cross-sectional profile is asymmetrical.

5. The laser of claim 4 wherein the second cross-sectional profile is substantially circular.

6. A laser for producing an output laser beam propagating substantially parallel to a z-axis being parallel to an optical axis, the output laser beam propagating in a space external to the laser, the laser comprising:

front and rear resonator mirrors bounding a resonator cavity, the front and rear resonator mirrors being aligned with respect to the optical axis; and a gain medium disposed between and having length along the z-axis extending toward the front and rear resonator mirrors, the gain medium having thickness with respect to a y-axis, the y-axis being transverse to the z-axis, the gain medium including first and second elongated portions, the first and second elongated portions extending substantially the length of the gain medium along the z-axis, the first elongated portion having a first width along an x-axis being transverse to the z-axis, the second elongated portion having a second width along the xaxis, the first elongated portion varying in y-axis thickness along the z-axis in a first manner, the second elongated portion varying in y-axis thickness along the z-axis in a second manner, the first manner being different than the second manner.

7. The laser of claim 6 wherein the first manner and second manners are both linear having different ratios of change of y-axis thickness to change in location along the z-axis.

8. The laser of claim 6 wherein the rear resonator mirror is tilted with respect to a plane containing the x-axis and the y-axis.

9. The laser of claim 6 further including a second optical axis, the second optical axis being transverse to the y-axis, and a second front resonator mirror, the rear resonator mirror and the second front resonator mirror being aligned with respect to the second optical axis.

10. The laser of claim therein the second optical axis is parallel to the first optical axis.

11. The laser of claim 6 further including a third elongated portion.

12. The laser of claim 11 further including an additional output laser beam propagating substantially parallel to the output laser beam.

13. A laser for producing an output laser beam propagating substantially parallel to a z-axis being parallel to an optical axis, the output laser beam propagating in a space external to the laser, the laser comprising:

front and rear resonator mirrors bounding a resonator cavity, the front and rear resonator mirrors being aligned with respect to the optical axis; and a gain medium disposed between and having length along the z-axis extending toward the front and rear resonator mirrors, the gain medium having thickness with respect to a y-axis, the y-axis being transverse to the z-axis, the gain medium including first and second elongated portions, the first and second elongated portions extending substantially the length of the gain medium along the z-axis, the first elongated portion having a first width along an x-axis being transverse to the z-axis, the second elongated portion having a second width along the x-axis, the first elongated portion varying in y-axis thickness along the x-axis in a first manner, the second elongated portion varying in y-axis thickness along the x-axis in a second manner, the first manner being different than the second manner.

14. The laser of claim 13 wherein the first manner has linear variation and the second manner has the y-axis thickness remain constant along the x-axis.

15. The laser of claim 13 wherein the first manner has linear variation and the second manner has non-linear variation.

16. The laser of claim 13 wherein a cross-sectional profile of the second elongated portion is circular, the cross-sectional profile being transverse to the z-axis.

17. A laser for producing an output laser beam propagating substantially parallel to a z-axis being parallel to an optical axis, the output laser beam propagating in a space external to the laser, the laser comprising:
  front and rear resonator mirrors bounding a resonator cavity, the front and rear resonator mirrors being aligned with respect to the optical axis;
  first and second elongated electrodes located between and extending toward the front and rear resonator mirrors, the first and second elongated electrodes being separated from each other, the first and second elongated electrodes each having a first edge running along the z-axis; and
  a gaseous gain medium disposed between the first and second electrodes and having length along the z-axis extending toward the front and rear resonator mirrors, the gain medium having thickness with respect to a y-axis, the y-axis being transverse to the z-axis, the gain medium including first and second elongated portions, the first and second elongated portions extending the length of the gain medium along the z-axis, the first elongated portion having a first width along an x-axis being transverse to the z- axis, the second elongated portion having a second width along the x-axis, the first elongated portion varying in y-axis thickness along the z-axis in a first manner, the second elongated portion varying in y-axis thickness along the z-axis in a second manner, the first manner being different than the second manner, the first elongated portion having an edge adjacent the first edges of the first and second electrodes, the first manner having the y-axis thickness of the first elongated portion vary in a linear manner along portions of the z-axis and the second manner having the y-axis thickness of the second elongated portion remain constant along the z-axis.

18. The laser of claim 17 wherein the first width of the first elongated portion is sized with respect to a desired output coupling for the laser.

19. The laser of claim 17 wherein the first width of the first elongated portion is sized according to the smallest y-axis thickness of the first elongated portion, a distance from an end of the first elongated portion to a location where the first elongated portion has the smallest y-axis thickness, and a wavelength of an internal laser beam propagating within the gaseous gain medium.

20. The laser of claim 17 wherein the first width of the gaseous gain medium has a total x-axis width and the first width of the first elongated portion is less than 90% of the total width of the gaseous gain medium.

21. The laser of claim 17 wherein the first width of the first elongated portion varies along the z-axis.

22. The laser of claim 17 wherein the gaseous gain medium includes at least one of the following gases: carbon dioxide, nitrogen, helium, xenon, oxygen, carbon monoxide, hydrogen, neon, krypton, argon, fluorine, and deuterium.

23. The laser of claim 17 wherein the gaseous gain medium is a metal vapor.

24. The laser of claim 17 wherein the first elongated electrode is coupled to a power supply.

25. The laser of claim 17 wherein the gain medium has non-planar surfaces.

26. A laser for producing an output laser beam propagating substantially parallel to z-axis being parallel to an optical axis, the output laser beam propagating in a space external to the laser, the laser comprising:
  front and rear resonator mirrors bounding a resonator cavity, the front and rear resonator mirrors being aligned with respect to the optical axis; and
  a gain medium disposed between and having length along the z-axis extending toward the front and rear resonator mirrors, the gain medium having thickness with respect to a y-axis, the y-axis being transverse to the z-axis, the gain medium including a first y-axis thickness at a first z-axis location and first x-axis location, including a second y-axis thickness at the first z-axis location and second x-axis location, including a third y-axis thickness at a second z-axis location and the first x-axis location, and including a fourth y-axis thickness at the second z-axis location and second x-axis location such that a ratio of the second y-axis thickness to the first y-axis thickness is different than a ratio of the fourth y-axis thickness to the third y-axis thickness.

27. A laser for producing an output laser beam propagating substantially parallel to z-axis being parallel to an optical axis, the output laser beam propagating in a space external to the laser, the laser comprising:
  front and rear resonator mirrors bounding a resonator cavity, the front and rear resonator mirrors being aligned with respect to the optical axis; and
  a gain medium disposed between and having length along the z-axis extending toward the front and rear resonator mirrors, the gain medium having thickness with respect to a y-axis, the y-axis being transverse to the z-axis, the gain medium including a first y-axis thickness at a first z-axis location and first x-axis location, including a second y-axis thickness at the first z-axis location and second x-axis location, including a third y-axis thickness at a second z-axis location and the first x-axis location, and including a fourth y-axis thickness at the second z-axis location and second x-axis location such that a ratio of the third y-axis thickness to the first y-axis thickness is different than a ratio of the fourth y-axis thickness to the second y-axis thickness.

28. A laser for producing an output laser beam propagating substantially parallel to a z-axis being parallel to an optical axis, the output laser beam propagating in a space external to the laser, the laser comprising:
  front and rear resonator mirrors bounding a resonator cavity, the front and rear resonator mirrors being aligned with respect to the optical axis; and
  a gain medium disposed between and having length along the z-axis extending toward the front and rear resonator mirrors, the gain medium having thickness with respect to a y-axis, the y-axis being transverse to the z-axis, the gain medium including first and second elongated portions, the first and second elongated portions extending substantially the length of the gain medium along the z-axis, the first elongated portion having a first width along an x-axis being transverse to the z-axis, the second elongated portion having a second width along the x-axis, the first elongated portion having a cross-sectional area with respect to the x-axis and y-axis that varies along the z-axis in a first manner, the second elongated portion having a cross-sectional area with respect to the x-axis and y-axis that varies along the z-axis in a second manner, the first manner being different than the second manner.

29. The laser of claim 28 wherein the cross-sectional area of the first elongated portion includes one of the following shapes: circular, annular, square, rectangular, and wedge-shaped.

30. The laser of claim 28 wherein the gain medium is excited by at least one of the following types of signals: direct current (DC), alternating current (AC), radio frequency (RF), optical, flashlamp, diode-pumped, solar, nuclear, chemical, and microwave.

31. A laser for producing an output laser beam propagating substantially parallel to a z-axis being parallel to an optical axis, the output laser beam propagating in a space external to the laser, the laser comprising:

front and rear resonator mirrors bounding a resonator cavity, the front and rear resonator mirrors being aligned with respect to the optical axis; and a gain medium disposed between and having length along the z-axis extending toward the front and rear resonator mirrors, the gain medium having thickness with respect to a y-axis, the y-axis being transverse to the z-axis, the gain medium including first and second elongated portions, the first and second elongated portions extending substantially the length of the gain medium along the z-axis, the first elongated portion having a first width along an x-axis being transverse to the z-axis, the second elongated portion having a second width along the x-axis, the first elongated portion having a cross-sectional area with respect to the z-axis and y-axis that varies along the x-axis in a first manner, the second elongated portion having a cross-sectional area with respect to the z-axis and y-axis that varies along the x-axis in a second manner, the first manner being different than the second manner.

32. The laser of claim 31 wherein the rear resonator mirror is folded and the resonator cavity is folded.

33. The laser of claim 31, further including a second gain medium disposed between and having length along the z-axis extending toward the front and rear resonator mirrors.

34. A method of tailoring a profile of an output laser beam transverse to an optical axis, the output laser beam originating from a resonator cavity, the method comprising:

selecting a profile to use as the profile of the output laser beam transverse to the optical axis;

varying thickness with respect to a first axis transverse to the optical axis of one or more strip portions of a gain medium with respect to the optical axis to produce an output laser beam having the selected profile transverse to the optical axis without requiring optical devices outside of the resonator cavity to modify the profile of the output laser beam transverse to the optical axis, the gain medium having main portions and the strip portions, each strip portion and each main portion having width with respect to a second axis transverse to the optical axis and the first axis.

35. The method of claim 34 wherein selecting a profile includes selecting a profile having an aspect ratio with respect to the first axis and the second axis (first axis:second axis) of one of the following: 1:1, 2:1, and 0.75:1.

36. The method of claim 34 wherein the gain medium is a gas mixture.

37. The method of claim 34 wherein the gain medium is a solid.

38. The method of claim 34 wherein selecting a profile includes selecting a symmetric profile.

39. The method of claim 34 wherein varying thickness includes varying thickness linearly.

40. The method of claim 34 wherein varying thickness includes shaping a pair of first and second electrodes and positioning the first and second electrodes apart from one another.

41. A laser for producing an output laser beam propagating substantially parallel to a z-axis being parallel to an optical axis, the output laser beam propagating in a space external to the laser, the laser comprising:

front and rear reflector systems being aligned with respect to the optical axis;

a gain medium disposed between and extending toward the front and rear resonator mirrors, the gain medium having longitudinal front and rear ends, the longitudinal rear end being designed to receive an input laser beam propagating substantially parallel to the z-axis; and the gain medium having first and second elongated portions, the first elongated portion having a first thickness with respect to a y-axis, the y-axis being transverse to the z-axis, the second elongated portion having a second thickness with respect to the y-axis, the first thickness of the first elongated portion varying along the z-axis in a first manner and the second thickness of the second elongated portion varying along the z-axis in a second manner.

42. The laser of claim 41 wherein the first manner has linear variation and the second manner corresponds to substantially zero variation.

* * * * *